March 7, 1939.   P. F. TIRRELL   2,149,693
LOOM
Filed Feb. 5, 1937   13 Sheets-Sheet 6

Fig. 6.

Inventor
Philip F. Tirrell
By Eugene E. Stevens
his Attorney

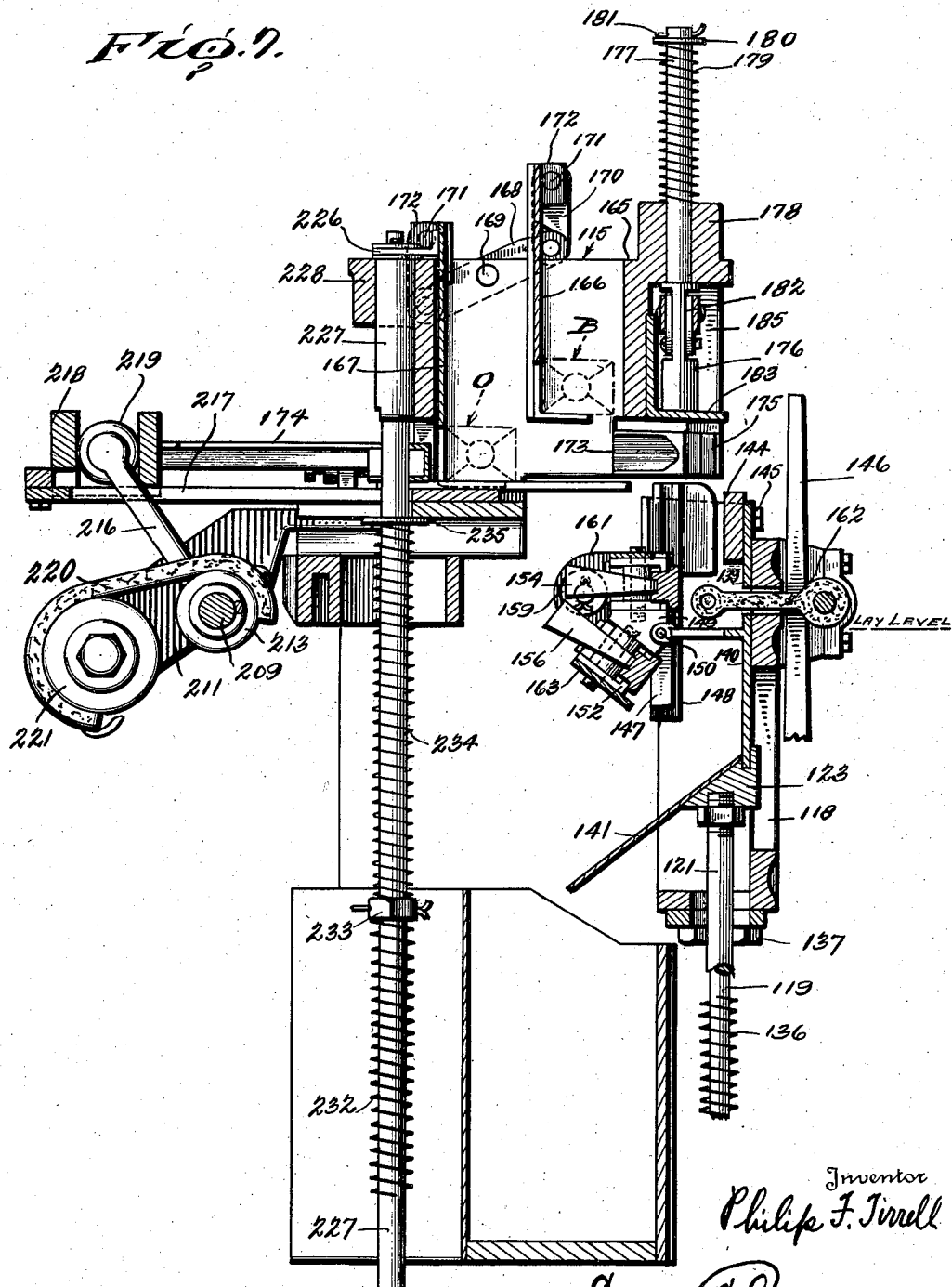

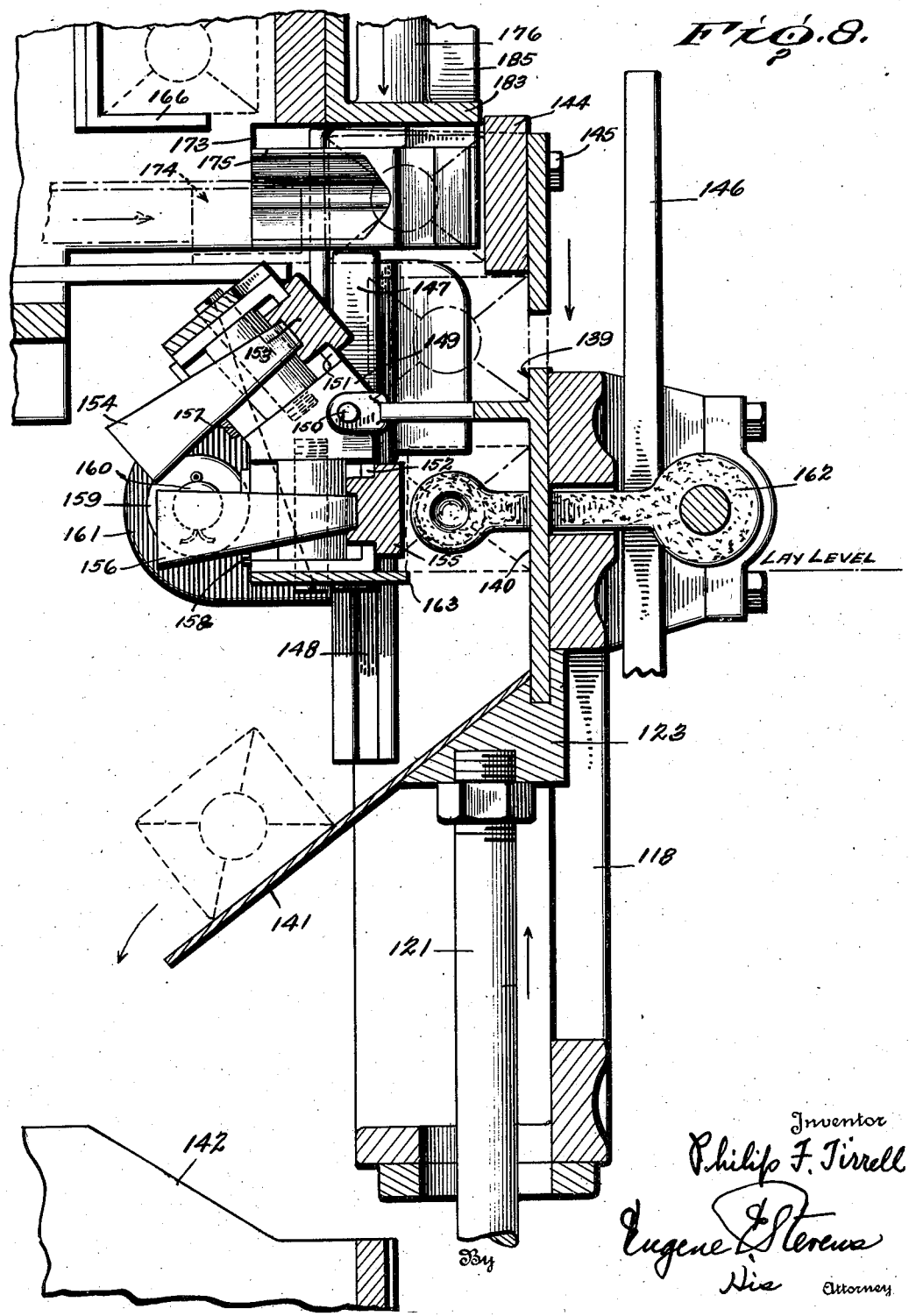

March 7, 1939. P. F. TIRRELL 2,149,693
LOOM
Filed Feb. 5, 1937 13 Sheets-Sheet 9
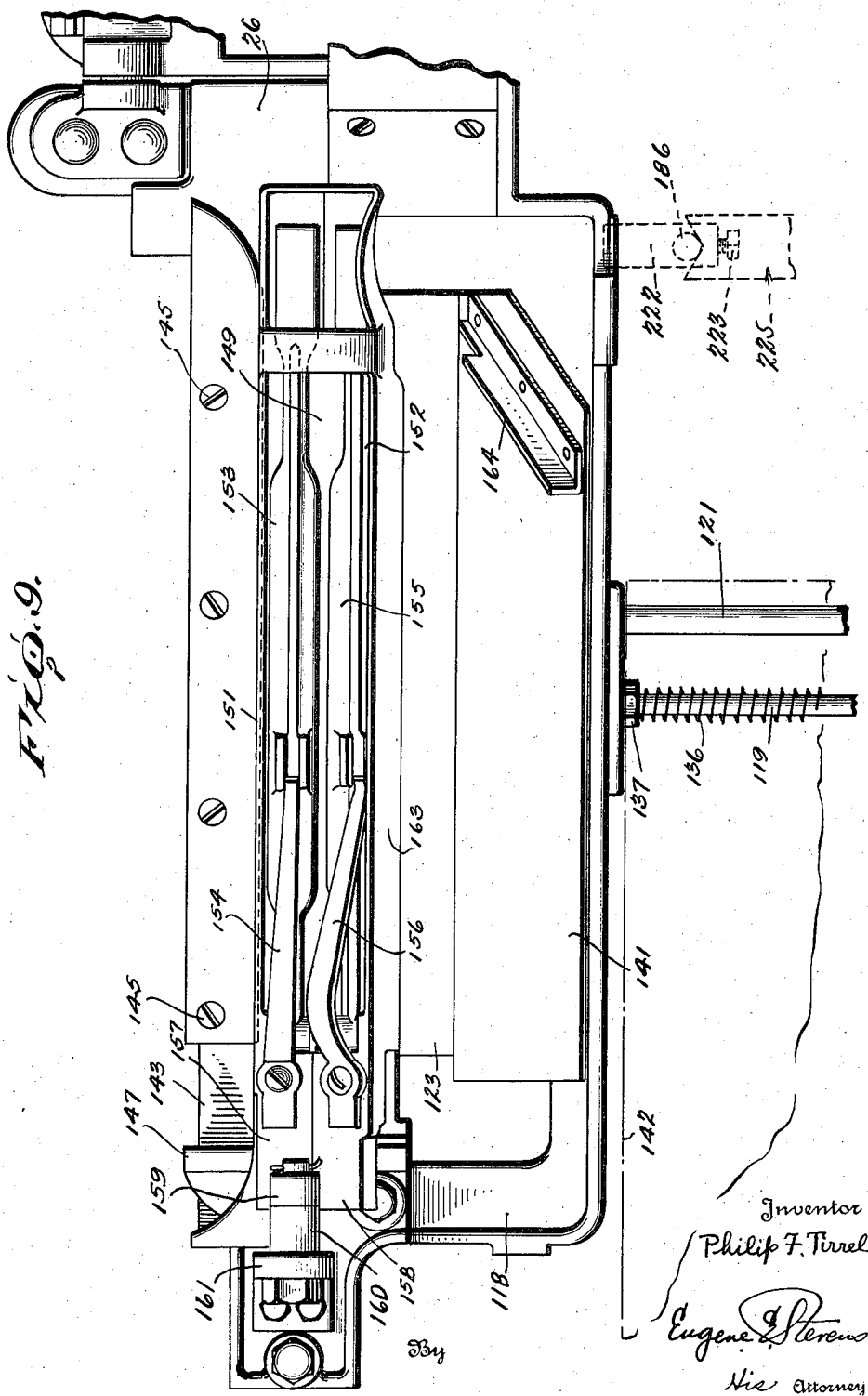

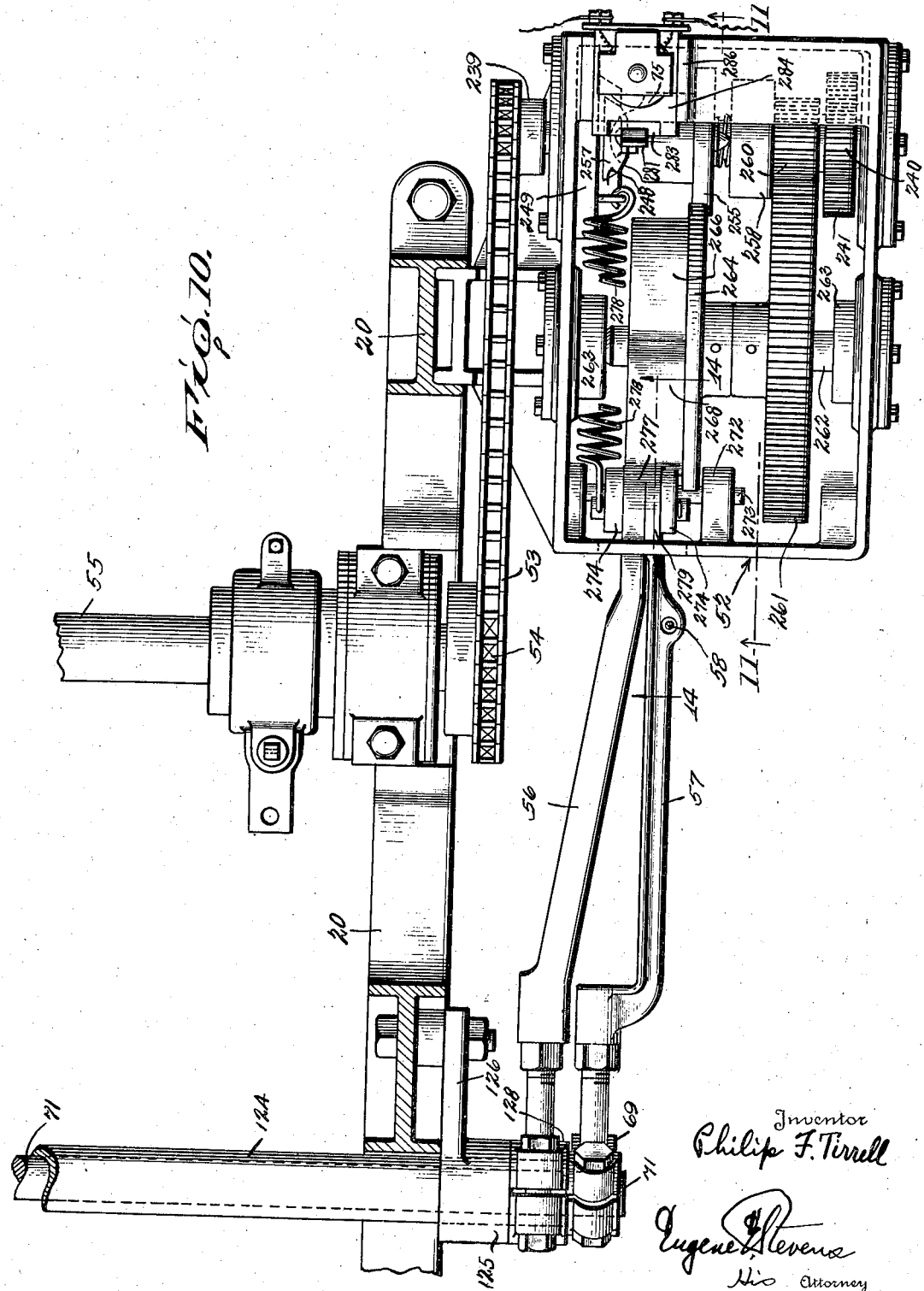

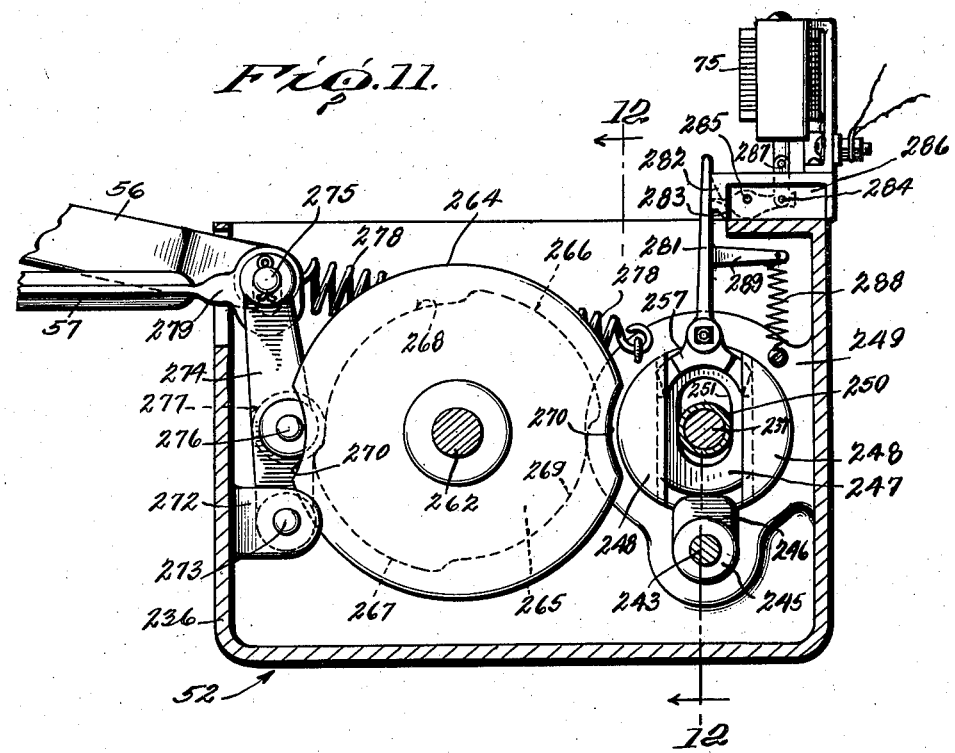

March 7, 1939. P. F. TIRRELL 2,149,693
LOOM
Filed Feb. 5, 1937 13 Sheets-Sheet 12
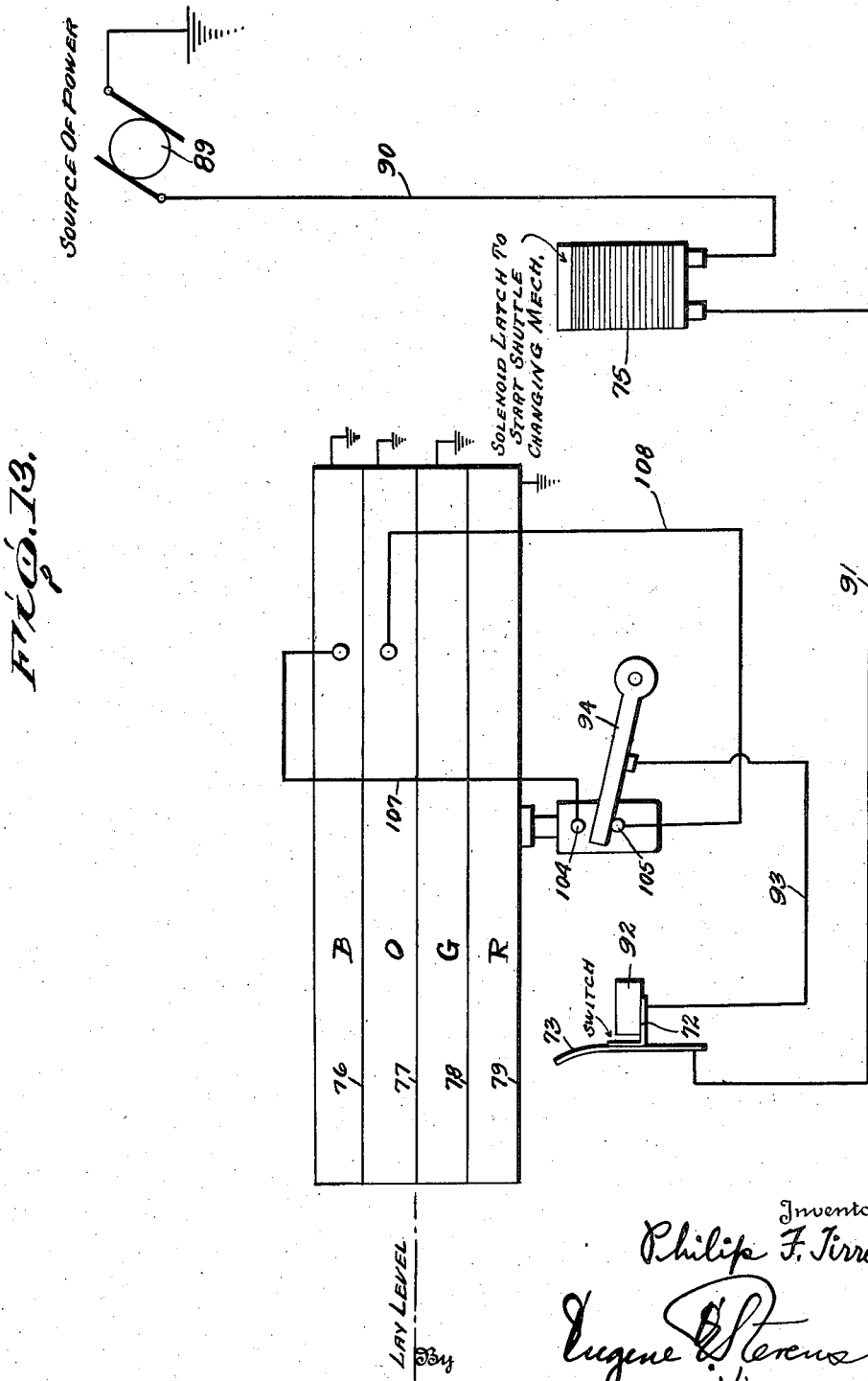

Patented Mar. 7, 1939

2,149,693

UNITED STATES PATENT OFFICE 2,149,693

LOOM

Philip F. Tirrell, Phillipsburg, N. J.

Application February 5, 1937, Serial No. 124,306

12 Claims. (Cl. 139—232)

This invention relates to looms and is a continuation in part of my prior application Serial No. 122,462, filed January 26, 1937.

At the present time the textile industry in various parts of the United States, in mills employing standard types of non-automatic looms, is experiencing very great difficulty in meeting the competition offered by textile mills in other parts of the country where cheap labor is easily obtainable. Many operators have found it necessary to shut down their mills as they cannot operate non-automatic looms on a basis comparable to the operation of such looms in those parts of the country where cheap labor conditions prevail. All such shutdowns and suspensions necessarily add to the unemployment problem.

It is well known to those versed in the art that in the operation of a non-automatic loom practically constant supervision is necessary. Such looms are equipped with mechanism automatically operable to stop the loom each time the thread of a shuttle is exhausted. The exhausted shuttle must be replaced by manual labor and beside this economic disadvantage the product of the loom suffers by the lapse in continuity of weaving.

An object of this invention is to provide mechanism capable of ready attachment to known types of non-automatic looms whereby the same are converted into automatic shuttle changing looms.

Another object is to provide automatic shuttle changing mechanism for looms that functions selectively to replace an exhausted shuttle by a full shuttle of the same variety of thread and without stopping or retarding the continuous operation of the loom.

Another object is to provide a novel type of feeler motion for the automatic shuttle changing mechanism of looms, wherein the motion is inhibited against operation unless and until the actuating shuttle is properly positioned for a discharge pick across the raceway of the lay into spent shuttle receiving means.

Another object is to provide loom operated automatic shuttle change control means selectively operable in accordance with loom pattern requirements.

Another object is to provide lay carried shuttle change box means shiftable thereon to receive and expel an exhausted running shuttle and to replace the same with a full shuttle in proper running alignment with the race plate of the lay, independently of the shifting shuttle box mechanism of a loom.

Another object is to provide mechanism attachable to a non-automatic loom in place of the conventional non-shifting shuttle box means and which functions to effect an automatic replacement of an exhausted running shuttle.

A still further object is to provide a loom having means, automatically operable upon the substantial exhaustion of thread in a running shuttle, to actuate a loom driven mechanism for delivering a replacement shuttle from a loom carried shuttle dispensing magazine, the loom driven mechanism being influenced in its operation by the pattern directing mechanism of the loom in such manner that the magazine will deliver a replacement shuttle of the same variety of thread as that of the exhausted shuttle.

It is additionally an object to provide in an automatic shuttle changing loom, a shiftable shuttle change box arranged to influence, by its position, certain operative phases of shuttle change.

Numerous other objects will be readily apparent to those skilled in the art of weaving.

The disclosure of this application constitutes a practical embodiment of means by which the invention is reduced to practice. As the structural details shown and described are capable of variation, it is to be understood that the mechanism herein shown and described may be varied in its details, within the limits defined by the scope of the invention as claimed.

In the following description the head end of the loom is intended to mean that end of the loom having the head motion control and having also the conventionally designated shifting shuttle box. The opposite end of the loom will be referred to as the plain end. In standard types of looms it is the plain end which is provided with the conventionally designated non-shifting shuttle box.

In the accompanying drawings:

Figure 6 is a front elevation of the automatic shuttle changing mechanism as operatively associated with the plain end of the loom.

Figure 7 is a vertical section taken substantially on the line 7—7 of Figure 6.

Figure 8 is a vertical section through the shuttle change box as operatively associated with the shuttle dispensing portion of the replacement shuttle magazine, and illustrating the phases of transferring a replacement shuttle from the magazine and discharging an exhausted shuttle.

Figure 9 is a front elevation of the shuttle change box and its guide.

Figure 10 is a top plan view of the control unit mechanism at the head end of the loom.

Figure 11 is a vertical section substantially on the line 11—11 of Figure 10.

Figure 12 is a vertical section substantially on the line 12—12 of Figure 11.

Figure 13 is a schematic illustration of the feeler motion control circuit as associated with the shifting shuttle box.

Figure 14 is a fragmentary section substantially on the line 14—14 of Figure 10.

Figure 1:
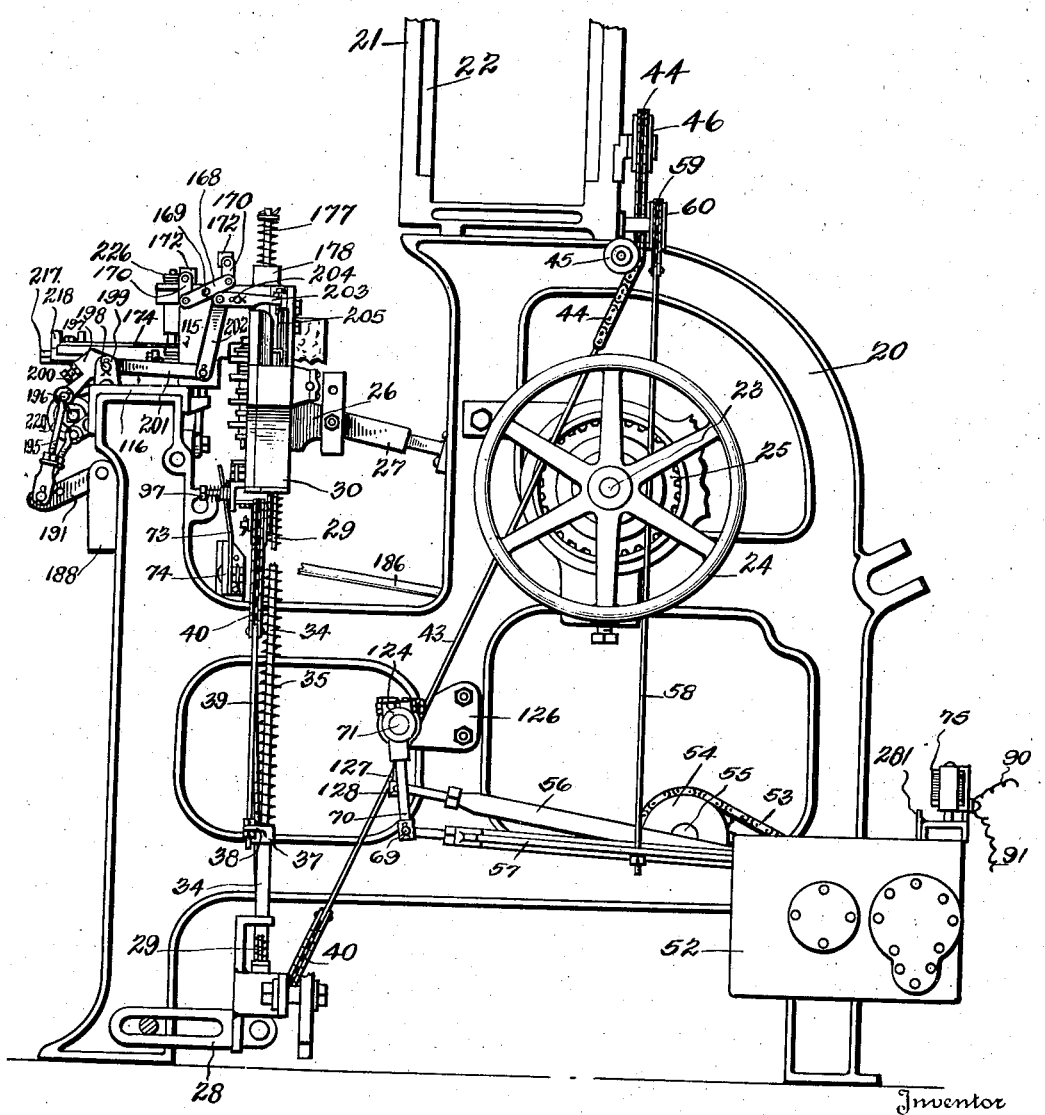
Figure 1 is an end elevation from the head end of a well-known type of non-automatic loom provided with the automatic shuttle changing mechanism of this invention, by which the loom is converted into an automatic loom.

Figure 1 illustrates the head end of a well-known type of non-automatic loom, such as shown in my said prior co-pending application, having the main frame 20 which supports the head arch 21 provided with the head motion seat 22. The frame supports the loom crank shaft 23 which has fixed thereto a hand wheel 24 for manual operation of the loom when desired. The crank shaft carries the head motion drive gear 25 and is further provided with the usual mechanism (not shown) for operating the oscillating lay 26 through the connecting rod means 27. As shown at the left of Figure 1, the bottom front of the main frame mounts the conventional rocker arm 28 seating the lower end of the shifting shuttle box guide post 29 which has fixed to its upper end the shuttle box guide 30. An expansion spring 31 is coiled loosely about the entire length of the shuttle box guide post 29 in abutting engagement against a post-carried fixed collar 32 at its upper end and against a foot plate element 32' at its lower end. The shuttle box guide is rigidly attached in the usual manner, as best shown in Figure 4, to the adjacent end of the lay 26 so that the shuttle box guide is carried by the lay and, of course, moves with it, the lower end pivoting with the rocker iron 28.

Figure 4:
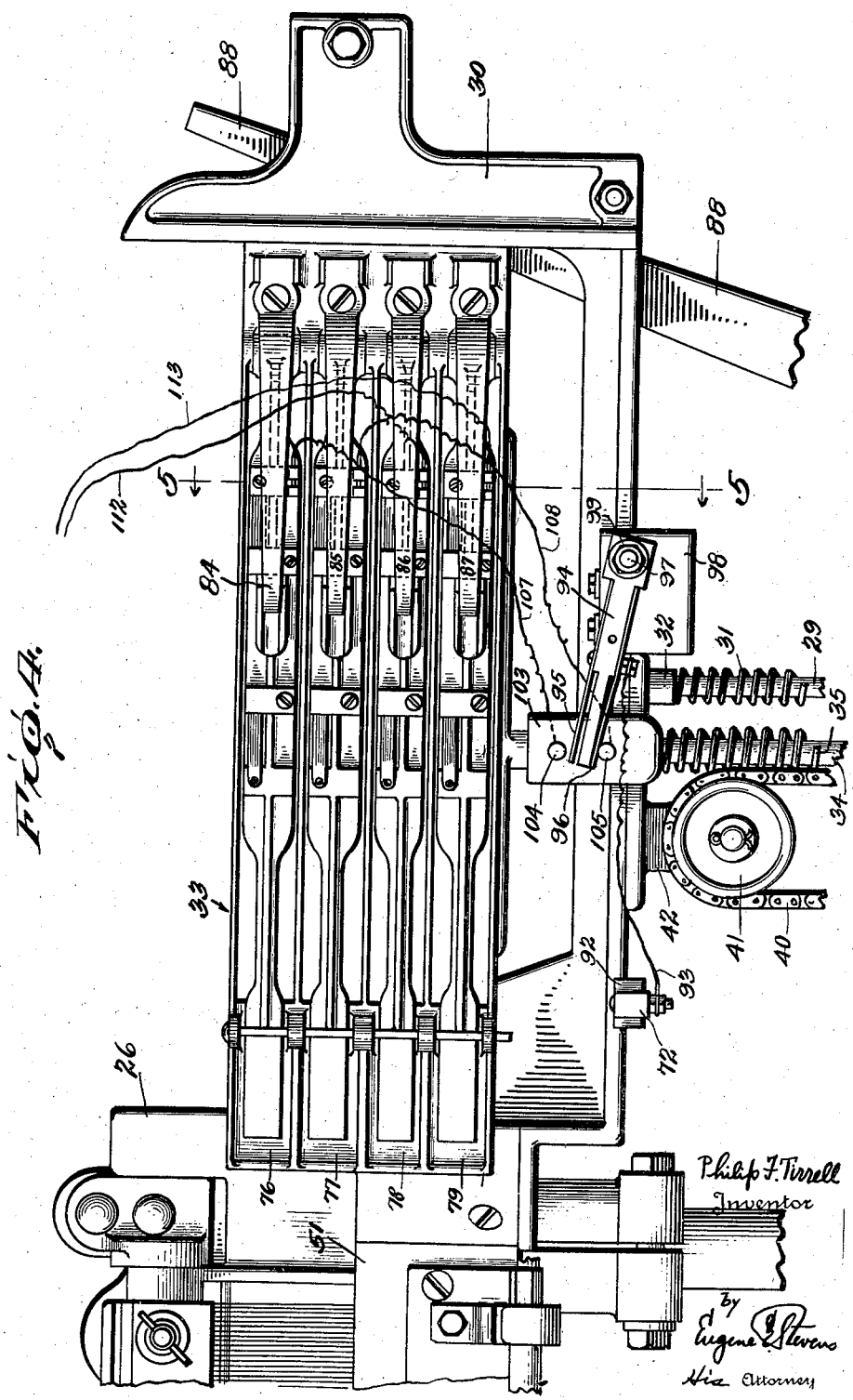
Figure 4 is a front elevation of the upper portion of the shifting shuttle box and the shuttle box guide as equipped with certain elements of the electrical feeler motion circuit selector means of the invention.
Figure 5:
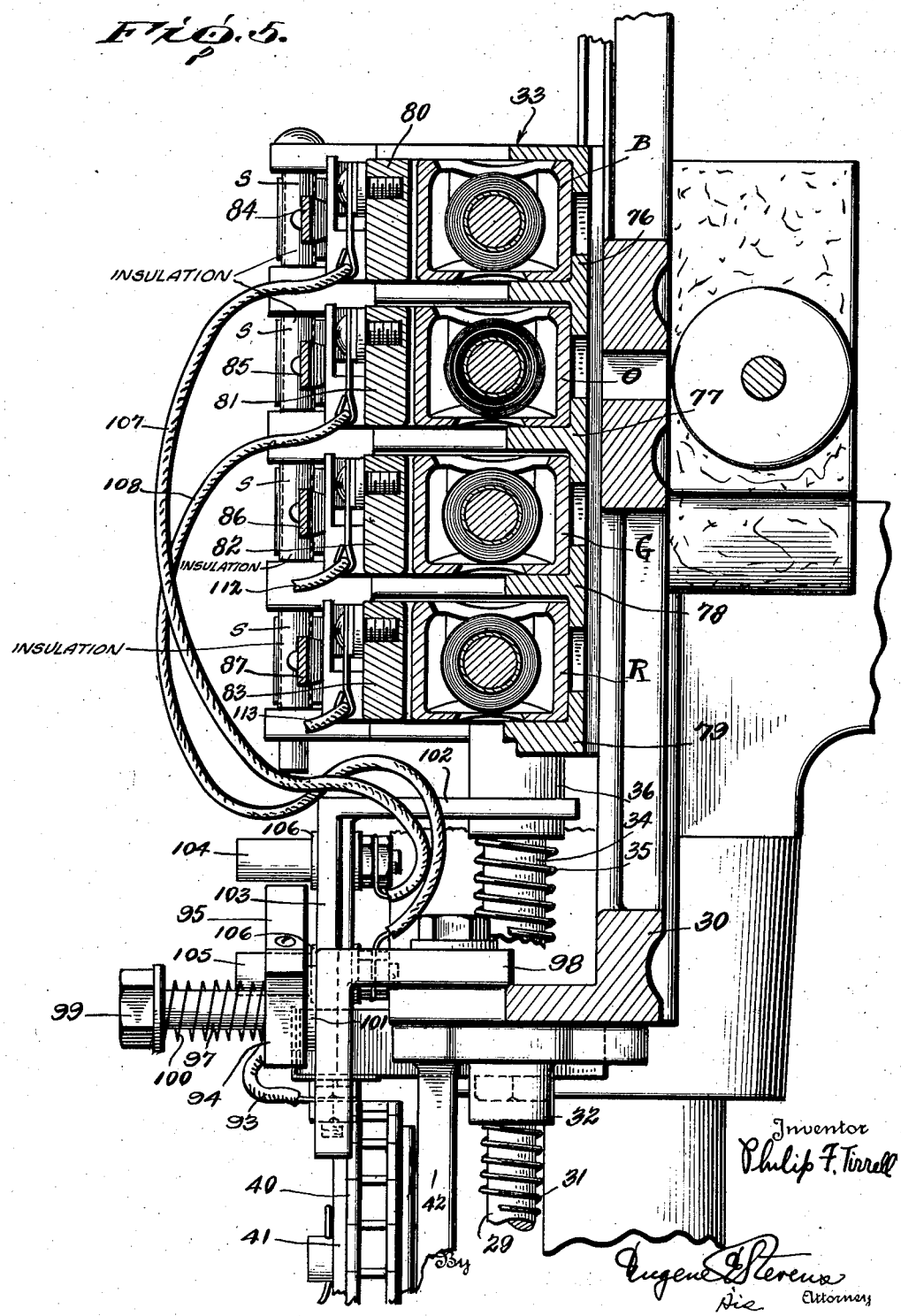
Figure 5 is a vertical section through the shifting shuttle box on the line 5—5 of Figure 4.
Figure 15:
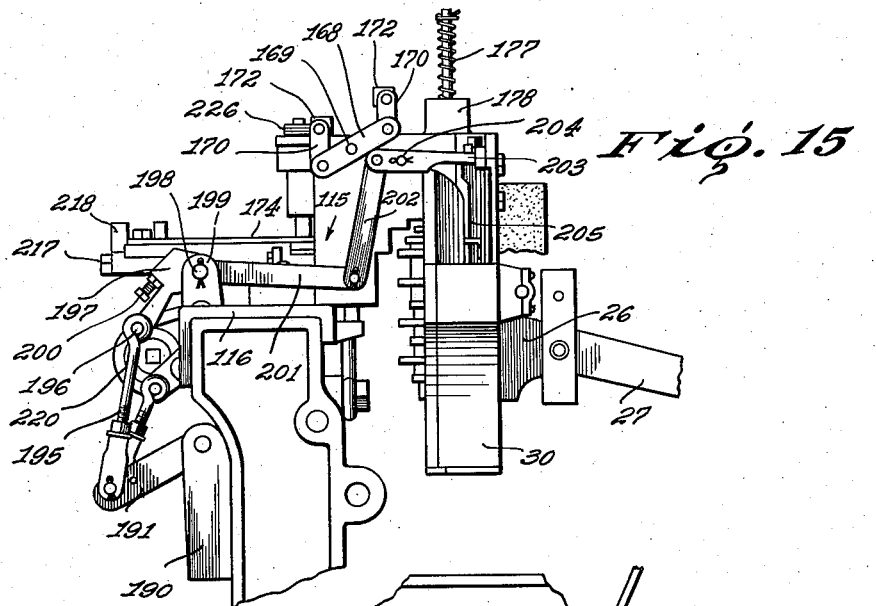
Figure 15 is an enlarged detail view of the structure shown at the upper left of Figure 1.
Figure 16:
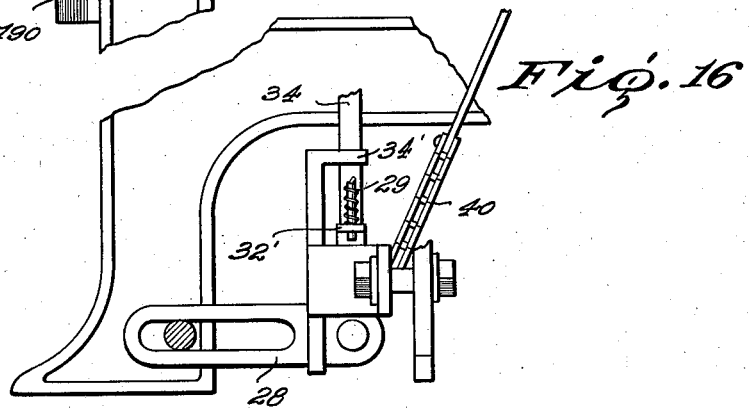
Figure 16 is an enlarged detail view of the rocker iron structure shown at the lower left of Figure 1.
Figure 17:
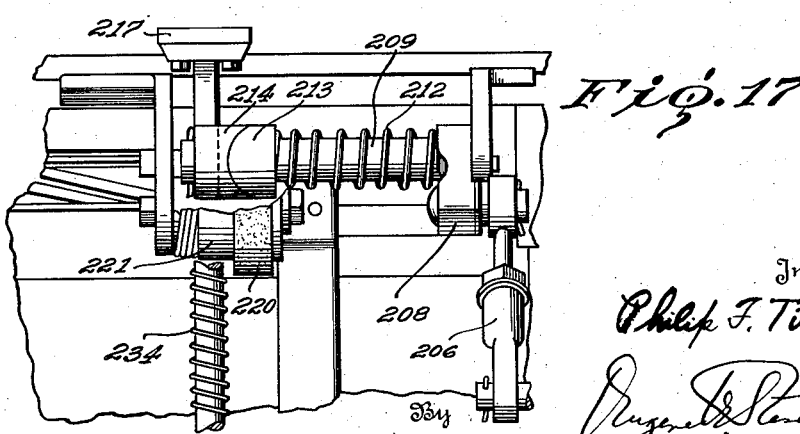
Figure 17 is a fragmentary elevation substantially at the mid-section of Figure 6, but with parts broken away for clearness of detail.

The shifting shuttle box 33, detailed in Figures 4 and 5, is adapted to reciprocate vertically within the fixed guide 30, its operating rod 34 being slidable at its lower end through bracket means 34' in the rocker iron 28. At its upper end the shuttle box operating rod 34 has a fixed connection with the shuttle box and is provided throughout a portion of its length with a coiled lifting spring 35 which bears loosely at its upper end against a rod carried stop member 36 and at its lower end, see Fig. 1, against a sleeve 37 slidably mounted on the rod and having an integral lateral ear 38 to which is attached the lower end of a lift rod 39. The upper end of rod 39 is attached pivotally to one end of a chain 40 trained over an idler 41 carried by a depending bracket 42 fixed to the shuttle box guide. The pull chain is, in the conventional manner, trained over an idler (not shown) carried by the frame 20 and continues upwardly in connection with the intermediate pull rod 43 connected at its upper end to the chain 44 which passes over an idler 45 at the top of the frame 20 and thence vertically upward over an idler 46 bracketed on the rear of the head motion seat 22. From the idler 46 the pull chain 44 is led to a shiftable idler 47 forming a part of the head motion and over which it is trained to connect at its end to an oscillatory lever 48 of the head motion as in Fig. 2. The lever 48 has a pivotal connection 49 at its lower end with a depending bracket 50 forming a part of the head motion seat 22.

As the head motion is operated in accordance with pattern, the flexible connection comprising the chains 40 and 44 and the rods 39 and 43 is pulled up or lowered in order to effect a vertical shifting of the shifting shuttle box 33 relative to the race plate 51 of the lay, as in conventional practice. The lifting and lowering is effected by movement of the oscillatory lever 48 and the shiftable idler 47 in the head motion. As the flexible connection from the head motion is operated to elevate the shifting shuttle box the lift rod 39 is drawn upwardly to compress the lift spring 35 which in turn, acting against the abutment 36, transmits the lifting force to the shuttle box operating rod 34 which rises through its support in the rocker iron 28. The operating rod 34 of the shifting shuttle box carries at its lower end within the rocker iron structure 28 the foot plate 32' engaging the lower end of the spring 31 on the shuttle box guide post 29 so that this spring is compressed as the shuttle box rod 34 rises. As the flexible connection from the head motion is lowered, the expanding action of the spring 31 through its connection with the lower end of the shuttle box rod operates to urge the shuttle box downwardly to its lowermost position.

All of the mechanism thus far described is conventional to non-automatic looms and forms no part of the present invention except as it enters into the general combination. The structure, being of a known type, is not herein illustrated in minute detail. It is more clearly shown in my said prior copending application and particular reference is made to Figure 2 thereof and to the descriptive matter dealing with the mounting and operation of the shifting shuttle box. It should here be mentioned that for clarity of detail in illustrating the novel subject matter, much of the conventional loom structure and the operating parts thereof have not been shown in the drawings. Also, in order to aid in illustration, the shuttle box guide post 29 is broken away in Figure 1 through its intermediate portion to disclose the shuttle box operating rod 34 which, in turn, is broken away at its upper portion in Figure 1. However, Figures 4 and 5 taken in connection with Figure 1 make the structure entirely clear.

Figure 2:
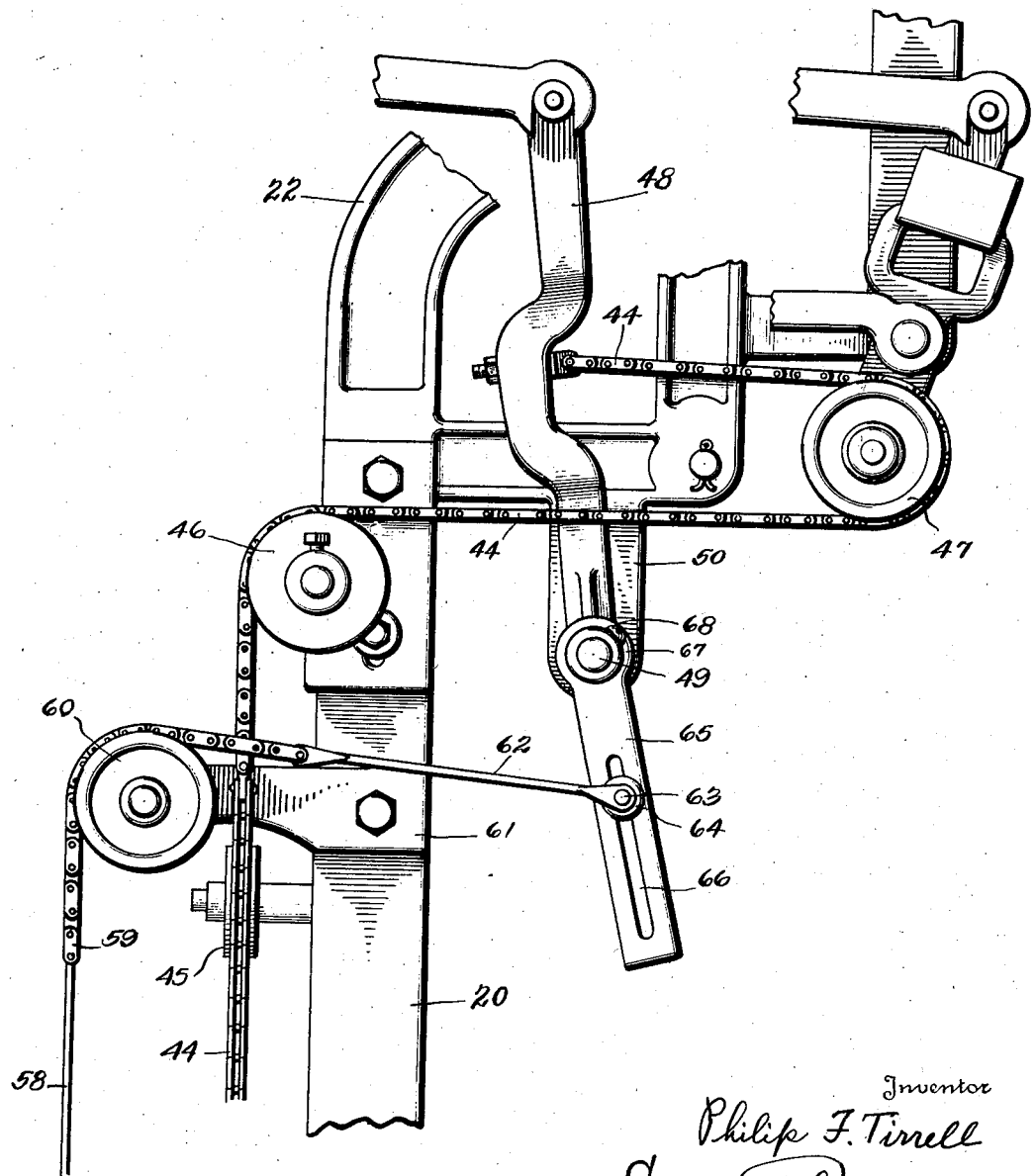
Figure 2 is a fragmentary elevation from the rear of the loom at the head end illustrating certain known structure of head motion control for the shifting shuttle box, as modified in accordance with the invention.

Further with reference to Figure 1, it will be seen that the loom frame at the lower rear head end mounts a control unit 52, the details of which are illustrated in Figures 10, 11, 12 and 14, which is operated by a chain drive 53 from a sprocket 54 fixed to the bottom shaft 55 of the loom. Through the medium of connecting rods 56 and 57 the control unit mechanism functions to shift the shuttle change box 123, Fig. 8, at the plain end of the loom and also to operate the replacement shuttle magazine in a selective manner for delivery of a replacement shuttle of the required thread variety, as determined by the thread variety of the exhausted shuttle to be replaced. As shown in Fig. 1, the connecting rod 57 is influenced in its operating cycle by means of a lift rod 58 connected at its upper end to a chain 59 trained over an idler 60 carried by a bracket 61 secured to the head motion seat 22. The other end of the chain 59 as shown in Fig. 2 has connection with a rod 62 which, in turn, has a pivotal end connection 63 with an attaching element 64 carried by a lever 65. The element 64 is adjustable in a longitudinal slot 66 provided in the lever 65, through which the element rides in effecting a desired adjustment. At its upper end the lever 65 is provided with an attaching sleeve 67 that takes over the pivot lug 49 of the head motion control lever 48, it being rigidly secured thereto in a desired adjusted position by means of a suitable fastening, such as a set screw 68, so that the levers 48 and 65 form, in effect, a continuous rigid lever that is fulcrumed intermediate its ends on the pivot 49. As the head motion operates in accordance with loom pattern requirements the lever 48 will be rocked on its pivot 49 and will cause a corresponding movement of the lever 65 to actuate the lift connections 58, 59 and 62 to raise or lower the connecting rod 57 extending from the control unit 52. The connecting rod 57 has at its forward end a pivotal connection 69 to a crank 70 fixedly clamped to the head end of a shaft 71 which extends longitudinally of the loom frame from end to end to cooperate with mechanism hereinafter described and which functions for selective operation of the shuttle replacement magazine. Due to its pivotal end connection 69 the connecting rod 57 is free to oscillate in a limited vertical arc at its opposite end within the control of the unit 52, as will be later described.

In the position of parts as shown in Figure 1 the lay is at its center forward position, at which point a fixed electrical contact 72, see Figure 4, carried by the box guide 30 of the shifting box 33, is in electrical contact with a flexible contact arm 73 suitably mounted in terminal post means 74 fixedly secured to an appropriate portion of the loom frame. The two contacts 72—73, comprise a lay controlled switch incorporated in the feeler motion control circuit system of the shifting shuttle box. The circuit includes a governing electro-magnetic means 75, such as a solenoid, mounted on the control unit 52 and which operates to establish a driving connection between the loom power and the mechanism of the control unit.

The shifting shuttle box 33 carries four vertically aligned shuttle cells 76, 77, 78, and 79 as shown from top to bottom in Figs. 4 and 5. The respective cells are provided with the usual binders 80, 81, 82 and 83 normally urged inwardly into each cell by the spring fingers 84, 85, 86, and 87, the binders being pivoted at one end to the shuttle box frame and having their opposite ends, adjacent the lay 26, free to move in a limited lateral arc to cooperate in a known manner with the usual loom protector rod means (not shown) for stopping the loom if no shuttle is in the particular cell which is aligned with the race plate of the lay when the lay reaches center forward position. Such means is conventional to standard types of looms and a showing of its details has been eliminated for purposes of clarity.

The various cells of the shifting shuttle box carry shuttles provided with thread that differs in variety or characteristics from that of each of the other shuttles. For convenience of description it will be assumed that the top cell 76 carries a shuttle B having a quill of blue thread, the second lower cell 77 carries a shuttle O of orange thread, the third lower cell 78 carries a shuttle G of green thread and the bottom cell 79 carries a shuttle R of red thread. In the embodiment of the loom herein described the shifting shuttle box is adapted to be operated with all four cells but actually operates with only the upper two cells. In the position of parts as illustrated in Figs. 4 and 5 it will be seen that the shuttle box is in position to permit a pick of the orange thread, the cell 77 containing the orange shuttle O being properly aligned with the race plate 51 of the lay.

Each cell of the shifting shuttle box is included in the electrical circuit of an electrical feeler motion, best shown on Figure 13, by which, upon the substantial exhaustion of an active shuttle, and provided it is in proper position with respect to the race plate of the lay, the mechanism for effecting an automatic replacement of the exhausted shuttle is set into operation. It should be here noted that in the four cell shifting shuttle box operation herein described, only the upper two cells 76 and 77 containing respectively the blue and orange shuttles cooperate with the feeler motion to bring about automatic replacement of their shuttles when exhausted.

As shown in Figure 13, the feeler motion circuit is from a source of power such as a current supply means 89, through wire 90, through the solenoid 75 in the control unit 52, see Figure 1, thence through wire 91 through frame carried contact finger 73 cooperating with the shuttle box guide contact 72 which is mounted on an insulating support 92, thence through wire 93 to a circuit selector 94 pivotally supported at one end upon and electrically insulated from the shuttle box guide 30. The opposite end portion of the selector is provided along its top and bottom edge with upper and lower spring contact fingers 95 and 96 which are mutually electrically connected through the body of the selector 94.

The body of the circuit selector 94, Figs. 4 and 5, is of suitable insulating material and is loosely secured at one end over a pivot pin 97 carried by and extending laterally forward from a supporting bracket 98 rigidly attached to the shuttle box guide 30. The outer end of the pivot pin 97 has threaded thereon a cap nut 99 providing an abutment for one end of an expansion spring 100 coiled about the pin 97 and bearing at its other end against the selector 94; the spring normally urging the selector into frictional binding engagement with a lateral enlargement 101 of the bracket 98, so that the selector arm 94 tends to remain set in the position to which it is moved.

The shuttle box 33 carries spaced contact means for cooperation with the selector 94 in establishing the feeler motion circuit selectively through certain cells of the shuttle box in accordance with the various positions assumed by the box during its operation. In the illustrated embodiment this means comprises a forwardly extending arm 102, see Fig. 5, rigidly secured at its inner end to the abutment head 36 of the shuttle box operating rod 34 and having its outer end provided with a depending flange portion 103 spaced horizontally from the selector bracket 98 and substantially in a common vertical plane therewith. The vertical depending flange 103 is provided with a pair of spaced contact pins 104 and 105 arranged in vertical alignment and electrically insulated from the flange by means of insulator bushings 106 passed through the flange and which provides supports for the contact pins. These pins extend in parallel spaced relation forwardly of the shuttle box in a position to receive therebetween the spring contact finger carrying portion of the selector 94. At its inner end the upper contact pin 104 is in electrical connection through the wire 107 with the metal binder 80 of the topmost or blue shuttle box cell 76, while the lower contact pin 105 is electrically connected at its inner end through the wire 108 with the metal binder 81 of the second lower or orange shuttle box cell 77. It is apparent that when the contact finger 96 of the selector 94 is in contact with the lower pin 105, as shown in schematic plan in Figure 13, the circuit will be established through the selector to the binder of the orange shuttle cell 77 which, in the position shown in the drawings, is aligned with the race plate of the lay. Each shuttle box cell is electrically grounded upon metallic elements of the shuttle box so that a return is provided for the circuit due to the fact that the source of current 89 is also grounded on one side of the circuit.

It should be here stated that the shuttles are each provided with means (not shown) whereby upon substantial exhaustion of the thread an electro-conductive area is exposed to establish electrical contact between the electro-conductive elements of the respective cell binders and the grounded cell walls. There are many known types of such shuttle construction and as the particular details thereof form no part of the present invention, except insofar as they enter into the general combination, such details are not illustrated. Likewise, the particular means or construction for establishing electrical contact through the cell binders to the shuttles can be embodied in a large variety of structural forms. It is immaterial what particular structure is adopted and the present invention comprehends any means for establishing such a contact. In the illustrated embodiment it is to be understood that where the contact is directed through the binders these elements are appropriately electrically insulated from the frame work of the shuttle box at all points where electrical contact might occur. Figure 5 illustrates that the binder stop rod carries insulator sleeves s against which the binders abut.

The lay controlled switch 72—73 closes only when the lay comes to center forward position. Even though a detected shuttle will close a portion of the feeler motion circuit through the particular shuttle cell affected before the lay reaches center forward, the circuit cannot be completed until the lay controlled switch closes, so that there can be no shuttle change until the exhausted shuttle cell is properly positioned with respect to the race plate of the lay. By reason of the selector element 94, even though the exhausted shuttle containing cell should have been shifted from race plate aligning position during a subsequent shift of the shuttle box under the head motion control, when the lay comes to center forward position and the lay controlled switch closes, there will be no actuation of the shuttle change mechanism unless the selector 94 is in contact with the particular contact pin 104 or 105 that is in circuit with the exhausted shuttle cell. This operation will be explained in more detail hereinafter.

Figure 3:
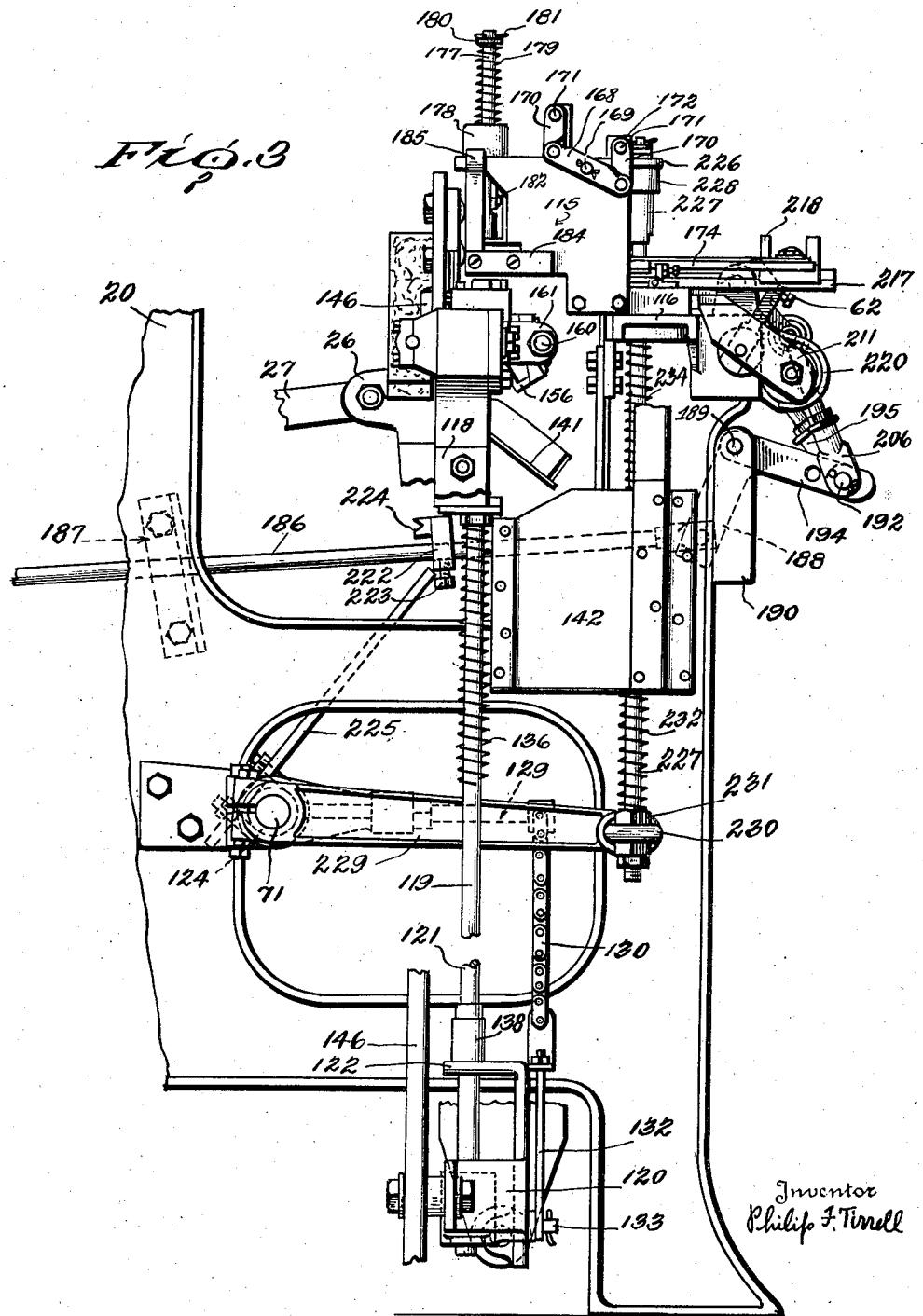
Figure 3 is an elevation of the forward portion of the plain end of the loom, illustrating details of the mounting and operation of the replacement shuttle magazine and the shuttle transfer mechanism.

As shown in Fig. 6 the plain end of the loom is provided with the means for receiving and discharging exhausted shuttles and for automatically replacing the same with shuttles of the same thread variety. This means comprises a replacement shuttle magazine 115, similar in all major respects to the replacement shuttle magazine disclosed in my said prior pending application, appropriately supported in fixed relationship on a channel support 116 rigidly attached at one end to the breast piece 117 of the loom frame and extending longitudinally from the frame. In this embodiment the non-shifting shuttle box conventional to non-automatic looms is removed and in place thereof is substituted a change shuttle box 123 of peculiar design. As shown in Figures 3, 6 and 9, this change box comprises a guide 118 having a supporting post 119 mounted at its lower end in the rocker iron 120. Also mounted in the rocker iron is the shuttle box operating rod 121 having its lower end vertically slidable through a bracket 122 of the rocker iron and having its upper end passed through the guide 118 into a fixed connection with the box 123 which is mounted for vertical reciprocation within the guide 118. As in the case of the shifting shuttle box 33, the change box 123, through its guide 118, is fixed to the adjacent end of the lay 26 so that it is oscillated on its rocker arm pivot in accordance with movement of the lay. The change box 123 is shiftable relative to the lay for the purpose of receiving replacement shuttles delivered from the magazine and for discharging exhausted shuttles. The vertical shifting movement of the box is accomplished from the control unit 52 by means of a sleeve shaft 124, Figs. 6 and 10, extending longitudinally of the frame to project beyond each end thereof and having end bearings 125 carried by bracket means 126 appropriately secured to the main frame. At the head end of the loom, as seen in Figure 1, the sleeve shaft 124 has rigidly secured thereto a crank 127 having a pivotal connection 128 with one end of the connecting rod 56, the other end of the rod being operatively associated with the mechanism of the control unit 52. At the plain end of the loom, as seen in Figures 3 and 6, the end of the sleeve shaft 124 has rigidly attached thereto a forwardly extending crank 129 having its outer free end in connection with a lift chain 130 which is in turn connected at its lower end to a hanger 131 to which is secured a depending lift rod 132 attached at its lower end to a lateral stud 133 carried by a sleeve 134 rigidly connected to the bottom end of the shuttle box operating rod 121 and having a lateral apertured lug 135 slidably engaging the lower end portion of the shuttle box guide supporting rod 119. An expansion spring 136 is coiled about the entire length of the shuttle box guide rod 119 with its lower end loosely bearing against the lifting lug 135 of the shuttle box operating rod 121 and with its upper end loosely bearing against abutment means 137 at the point of connection of the post 119 with the shuttle box guide. From this construction it will be apparent that when the sleeve shaft 124 is rocked in a clockwise direction under the influence of the connecting rod 56 at the head end of the loom, the crank arm 129 at the plain end of the sleeve shaft will be elevated counterclockwise to elevate the chain 130 and cause a vertical lift of the shuttle box operating rod 121 against the tension of the spring 136 on the shuttle box guide post, the spring being compressed by the upward sliding movement of the bearing lug 135 which is fixed to the lower end of the box operating rod 121. The box operating rod is provided with stop collar means 138 above the rocker iron bracket 122 for cooperation therewith to limit the extent of downward movement of the shuttle box. Conversely, as the sleeve shaft 124 is rocked counterclockwise at the head end of the loom under the influence of the connecting rod 56, the crank arm at the plain end will be rocked in a clockwise direction, slackening the chain 130 and permitting the shuttle box to move downwardly under the influence of the spring 136 acting against the bearing lug 135.

As best shown in Figures 7 and 8, the change box 123 is provided with an upper cell 139 and a lower cell 140, with the lower cell having an open bottom spaced above a forwardly and downwardly inclined shuttle deflector plate 141 down which shuttles, as shown in dotted lines in Figure 8, are delivered by gravity to a spent shuttle receptacle 142 suitably supported by bracket extensions from the framework supporting the magazine 115.

The rear wall 143, see Fig. 9, of the change box 123 extends appreciably above the horizontal plane of the top of the front wall and is provided substantially throughout its longitudinal extent with an attached keeper bar 144 secured to the inner face of the wall by means of suitable fastening elements 145. At its lay end the keeper bar is curved downwardly and inwardly from its upper edge to its bottom in order to facilitate the entry of shuttles into the cell 139 as they leave the race plate of the lay. The keeper bar 144 functions also as a buffer for receiving shuttles dispensed from the shuttle replacement magazine, as will be later described.

In the position of parts shown in Figures 7 and 9, the change box 123 is in its lower position, which is its normal operating position with respect to the race-plate of the lay, the upper cell 139 being aligned with the race plate to receive the active shuttle and return the same across the lay by the operation of the plain end picker stick 146. At its far end with respect to the lay, the front wall of the box is provided with a cross head 147 vertically slidable in the cross-head guide 148 carried by the adjacent end frame of the shuttle box guide 118. Between the cross-head 147 and the other end of the box its front wall is of skeleton formation and consists of an end block 149 pivoted to be rocked in a vertical plane on a pivot stud 150 journaled in the end block and in the adjacent cross head 147; the pivot stud extending well into the end block. The block 149, see Fig. 8, is provided with an upper shuttle cell wall section 151 and a lower shuttle cell wall section 152, the two wall sections being disposed in planes that intersect at an obtuse angle, the pivot stud 150 being disposed substantially at the apex of the angle. The upper wall section 151 carries the usual shuttle binder 153 that is normally urged inwardly of the wall by its actuator spring 154, and the lower wall section 152 is likewise provided with a shuttle binder 155 associated with its actuator spring 156, the two springs normally urging the binders inwardly of the walls for firm clamping engagement with shuttles when positioned within the cells as indicated by the dotted line showing of Figure 8. The outer or front face of the upper section of the end block 149 is provided with a plane portion 157, the plane of which parallels the plane of the front wall section 151, and the bottom portion of the end block has its outer or front face also provided with a plane portion 158 that is parallel with the plane of the lower front wall 152, the plane portions 157 and 158 intersecting at an obtuse angle and providing bearing surfaces constituting cams which engage with a roller 159 loosely journaled on a stub shaft 160 fixed in a lateral bracket 161 which is secured to the adjacent end portion of the box guide frame 118. It will be obvious that as the change box 123 is shifted, one and the other of the cam surfaces 157 or 158 will engage with the roller 159 to swing the end block on its pivot stud and bring the particular wall section of that portion of the end block thus engaged into vertical position with respect to the box, so that it completes the formation of the shuttle receiving cell.

As shown in Figure 7, the change box 123 is at its lower position, with the floor of the upper cell 139 arranged at the level of the race plate of the lay and with the upper front wall section of the end block 149 parallel to the rear wall of the box; the binder 153 projecting into the interior of the cell to engage a shuttle when it arrives in the box. The upper cell 139 constitutes the normal running cell, its rear wall being slotted for the reception therethrough of the shuttle driving element 162, operated in the usual manner by the picker stick 146.

Figure 8 illustrates the position assumed by the change box 123 when it is elevated to its upper position. As the box rises in its guide the roller 159 engages the cam portion 158 to rock the end plate 149 on its pivot stud and move the lower shuttle cell wall section 152 into vertical position so that its binder 155 extends inwardly of the box in position to engage an incoming shuttle. The under face of the lower wall section is provided with an attached, longitudinally extending, inwardly projecting plate 163 which provides a flooring ledge defining the bottom of the cell 140. It should be noted that the ledge 163 extends only slightly inwardly of the box cell. In this raised position of the change box the upper front wall portion 151 will be positioned at an outward angle with respect to the box, as shown in Figure 8, so that the wall portion 151, and its binder 153, clears the upper cell; being inclined upwardly and outwardly therefrom to act as a shuttle deflecting and transfer means for a replacement shuttle delivered by the ejecting mechanism of the replacement magazine, later to be described. Spent shuttle deflector plate 141 is provided at the lay end with an angled guide 164 so positioned as to direct spent shuttles toward the opposite end of the plate 141 for delivery into the receptacle 142 which, as shown in Figure 6, is offset with respect to the plate 141 in order to provide adequate clearance for operating parts of the mechanism.

The replacement shuttle magazine, best shown in Figs. 6 and 7, is, as previously stated, substantially identical in all major respects with the magazine shown and described in my said prior copending application. The magazine, generally designated as at 115, is of the dispensing type and embodies a casing 165 provided with a pair of shuttle stack holders 166 and 167 disposed side by side longitudinally of the casing and adapted to be moved vertically therein in separately defined paths by means of a toggle lever 168 fulcrumed intermediate its ends on a pivot 169 mounted on the exterior face of the casing at each end thereof. The ends of each lever 168 are connected by links 170 having pivotal connections at their upper ends with pivot studs 171 extending longitudinally of the casing from ears 172 secured to the upper edge portions of the shuttle stack holders. When the lever 168 is rocked on its pivot the pair of shuttle stack holders will be shifted accordingly, one being elevated simultaneously with the lowering of the other. Each shuttle stack holder 167 and 166 contains a stack of shuttles of the same thread variety. For purposes of illustration it will be assumed that the shuttles carried by the vertically slidable holder 167 are of the orange variety while the shuttles carried by the holder 166 are of the blue variety. In Figure 7 only the lowermost shuttles of each stack are shown, these being designated respectively as O and B denoting orange and blue.

The rear wall of the casing is apertured longitudinally at its bottom to provide a shuttle discharge port 173 and the front wall of the casing is longitudinally apertured in alignment with the discharge port 173 to provide a passage accommodating a dispensing plunger 174 adapted to be reciprocated across the bottom of the casing to dispense shuttles from the magazine. Each shuttle stack holder 166 and 167 is apertured at its lower portion to accommodate passage therethrough of the plunger 174 in a shuttle dispensing movement. Extending laterally from the rear wall of the magazine casing at each end is a dispensed shuttle receiving holder 175, the two holders cooperating longitudinally of the magazine to grip and retain therein a shuttle as dispensed from the magazine by the operation of the slide 174. The rear wall of the magazine casing is also provided with a vertically operable plunger 176 mounted at the lower end of an operating rod 177 guided through a bearing 178 provided on the casing wall and normally biased to elevated position by means of an expansion spring 179 coiled loosely about the shank of the rod 177 between the top of the bearing 178 and a stop washer 180 maintained at the top of the shank by means of a cotter key 181. The plunger 176 is adapted in the operation of the mechanism, to be depressed vertically down through the space between the shuttle holders 175 into engagement with a shuttle contained therein, as illustrated by dotted lines in Figure 8, whereby to transfer the dispensed shuttle directly downward onto the inclined deflector and guide provided by the upper wall section 151 of the change box 123 when the same is in its elevated position to receive a replacement shuttle. The downward movement of the plunger 176 transfers the dispensed shuttle to the top cell 139 of the box 123 which, it will be understood, has risen to its elevated position prior to the replacement shuttle transfer. As the replacement shuttle is pushed downwardly it will be moved laterally into proper position in the cell 139 by reason of the inclined open wall section 151 of the box.

The rear wall of the magazine casing carries a longitudinally disposed lever 182 fulcrumed between its ends and having a pivotal connection at one end with the shank of the plunger 176 and having its other or free end extending beyond the end of the casing toward the lay in operative engagement with actuating mechanism to be described. The rear wall of the magazine casing also supports a laterally directed guide plate 183 in horizontal alignment with the top of the shuttle discharge port 173 and which extends outwardly the length of the respective dispensed shuttle holders 175. The plunger 176 works vertically through the guide plate 183 in its operation of transferring a dispensed shuttle to the upper cell of the change box. The dispensed shuttle holders 175 are attached to the inner faces of supports 184 secured to the casing ends by means of suspension arms 185 pivotally suspended from the upper front edge of the casing at each end.

The shuttle stack holders of the magazine are selectively operable to position the lowermost shuttle of a selected stack in horizontal alignment with the dispensing slide 174 and the shuttle discharge port 173, so that upon operation of the slide a replacement shuttle of the desired variety of thread is dispensed from the magazine to the dispensed shuttle holding means 175 for subsequent transfer to the upper cell of the change box. The shifting of the shuttle stack within the magazine is dependent upon the thread variety of the exhausted shuttle detected in the shifting shuttle box 33 which initiates, through the feeler motion, the automatic shuttle replacement. As illustrated in Figure 7, the magazine is arranged to dispense shuttles of orange thread, this being the normal operating position of the magazine shuttle stacks, the blue shuttle holder 166 being elevated to permit passage of orange shuttles thereunder under the influence of the dispensing slide 174.

The position of the change box 123 determines the operation of the magazine. When this box is in its normal running position, that is when it is lowered with its upper cell 139 aligned with the race plate of the lay, the magazine cannot be actuated to dispense a shuttle.

The mechanism for operating the shuttle dispensing slide and transfer plunger of the magazine is shown in Figs. 3, 6 and 7 and consists of a driven push rod 186 loosely slidable in a frame carried hanger 187 for driven reciprocation forwardly and rearwardly of the loom. The inner end of the pusher rod 186 is free, being unconnected to any element of the loom. At its outer or front end the rod 186 has a pivotal connection with the short arm 188 of a bell crank lever fulcrumed on a pivot shaft 189 having a supporting bearing in a bracket flange 190 secured to the loom frame. The other arm 191 of the bell crank lever is pivotally connected with a pivot pin 192 carried in a bearing 193 in a rocker arm 194 which parallels the bell crank lever arm 191 and which at its inner end is fulcrumed on the shaft 189. The relatively wide bearing provided by the rocker arm 194 with its bearing 193 permits the use of a relatively long pivot pin 192 which, as shown in Figure 6, extends appreciably beyond opposite sides of the bearing 193. The shuttle dispensing slide of the magazine as well as the transfer plunger are both operated from the bell crank lever 188.

At the lay end of the pivot pin 192, see Fig. 6, there is provided an adjustable link 195 having pivotal connection at one end with the pin 192 and at its other end a pivotal connection with a pivot pin 196 carried by one end of a driving rocker 197 which is fulcrumed at its other end on a shaft 198 supported in a pair of upstanding bearing lugs 199 secured to the frame supporting channel member 116. The driving rocker 197 carries an adjustable thrust member 200, such as a set screw, that is adapted, at a certain operating position of the driving rocker, to bear downwardly upon a lever 201 that is, as shown in Fig. 1, fulcrumed at its outer end to the pivot shaft 198. The point at which the thrust element 200 of the driving rocker engages the lever 201 to depress the same occurs inwardly of the loom with respect to the shaft 198, so that the inner end of the lever 201 travels downwardly through a vertical arc. The inner end of this lever 201 has a pivotal connection with a substantially vertical link 202 that is pivotally connected at its upper end with the forward end portion of a lever 203 fulcrumed intermediate its ends on a pivot stud 204 carried by the adjacent end of the magazine casing, the inner end of the lever 203 being pivotally connected to the upper end of a depending lifting link 205 whereof the lower end is operatively connected to the actuating lever 182 at its end. The lever 182 is, as previously stated, fulcrumed intermediate its ends on the rear wall of the magazine casing with its inner end pivotally connected to the shank of the shuttle transfer plunger 176.

By virtue of the connections just described it will be apparent that when the bell crank arm 191 is actuated in a clockwise direction with respect to Figure 1, the link 195 will in turn operate the driving rocker 197 to rock the same on its fulcrum 198 to bring the thrust element 200 into depressing engagement with the lever 201 which, upon being depressed, pulls down upon the link 202, rocking the lever 203 on its fulcrum to effect a lifting pull upon the link 205 which in turn elevates the end of the plunger actuating lever 182 to rock the same on its fulcrum and depress the plunger 176 to transfer the shuttle in the shuttle holding means 175, the plunger being depressed against the tension of the spring 179 coiled about the plunger shank 177. When actuating force on the bell crank arm 191 is released the spring 179 acts by its expansion to return the parts to their normal positions.

The mechanism for actuating the shuttle dispensing slide of the magazine, best shown in Figures 6 and 7, comprises an adjustable link 206 pivotally connected at its outer end to the bell crank lever actuated pivot pin 192 and having its inner end pivotally connected to a stud 207 mounted in a crank arm 208 fixed at its inner end to a shaft 209 journaled in a pair of supports 210, 211 carried by the mounting frame work of the channel support 116.

The attached end of the crank 208 provides a stop shoulder for one end of a coiled expansion spring 212 disposed around the shaft 209 and bearing at its other end against a clutch member 213 keyed to the shaft and slidable longitudinally thereon under the influence of the spring 212. A clutch member 214 loose on the shaft, and retained thereon by the cotter key 215, is provided with a radial groove which receives the lower end of the ejector slide operating lever 216 which has its upper end extended through a longitudinal slot provided in the ejecting slide guide bar 217 into the seating recess of the slide block 218 to which the ejector slide 174 is connected for reciprocation over the guide bar 217. Within the block the end of the actuating lever is provided with a roller 219 bearing against the walls of the block seat. From this construction it will be apparent, viewing Figure 7, that a clockwise rotation of the shaft 209 will, through the spring engaged clutch element, actuate the lever 216 to move the shuttle ejecting slide 174 through the magazine to discharge the shuttle O to the dispensed shuttle holding means 175. At the conclusion of its ejecting stroke the slide 174 is returned to retracted position by means of a pull strap 220 connected at one end to the sliding clutch element 213 and at its other end to a spring pulley 221 journaled in the support 211. As the lever 216 is rocked to operate the ejector 174 the pulley spring is unwound so that when actuating force on the shaft 209 is released the pulley spring rewinds the strap 200 to return the parts to their initial position.

The structure described in the preceding paragraph is identical with the corresponding structure disclosed in my said prior co-pending application.

Having thus described the operating linkage and mechanism for actuating the shuttle ejecting slide 174 and the shuttle transferring plunger 176 from the crank lever 188, the means for actuating the bell crank lever will now be described. This means includes the loose driven actuator rod 186, previously described.

In the normal movement of the change box 123 with the lay the actuator rod 186 lies dormant, being inclined inwardly and downwardly with respect to its pivotal connection with the bell crank lever 188. At a point adjacent the operating zone of the box the rod 186 carries a fixed abutment member 222, substantially in the form of a rectangular collar, adjustable longitudinally of the rod by means of a set screw 223. The rear face of the abutment member is formed as at 224 for interengagement with a portion of the bottom frame bar of the change box guide 118. Normally in the arc of oscillation of the box guide 118 as it moves with the lay, there is a clearance between the bottom frame bar of the guide and the uppermost portion of the rod carried abutment 222 so that there is no possibility of these elements becoming engaged. As the box is elevated by movement of the rock shaft 124 under the influence of the control unit, as previously described, the lift arm 225 which is fixedly clamped at its lower end to the rock shaft 124 and which extends at an incline upwardly and forwardly therefrom to underlie the actuator rod 186 at its upper end, is rocked counterclockwise with respect to Figure 3 whereby to engage the rod 186 and elevate the same; the movement being sufficient to interpose the abutment 222 in the path of travel of the bottom frame bar of the box guide 118. This lifting of the rod 186 occurs, of course, while the lay is at a rear position so that the box guide 118 is then disposed rearwardly of the abutment 222. As the lay, and the lay carried change box guide, moves forward, the front edge of the bottom frame bar of the guide will engage the portion 224 of the rod carried abutment whereby to drive the rod 186 forwardly to rock the bell crank lever 188 on its pivot shaft 189 and actuate the shuttle ejecting slide of the magazine and the transfer plunger as previously described. At the conclusion of the actuating stroke the box guide moves rearwardly to disengage the abutment 222 whereupon the rod 186 drops back to its initial position so that the abutment is clear of the guide until again elevated.

The operation of the means for shifting the shuttle stack carriers within the magazine for selective delivery of replacement shuttles will now be described in detail. As best seen in Figure 7, the forward upper edge of the shuttle stack carrier 167 has fixed thereto a laterally extending flange 226 to which is rigidly attached the upper end of a lift rod 227 vertically slidable in a guide bearing 228 carried by the front wall of the magazine. Due to the toggle link mechanism connecting the two shuttle stack carriers it is obvious that as the rod 227 is raised and lowered the two shuttle stack holders will be shifted accordingly within the magazine. The operating rod 227 extends vertically downward through a longitudinal slot provided in the shuttle ejecting slide 174 and through the slot provided in the guide 217. At its lower end the actuator rod 227 terminates substantially in the horizontal plane of the sleeve shaft 124 which carries the concentric inner shaft 71. This shaft projects beyond the end of the sleeve and, as seen in Fig. 3, has appropriately secured thereto in fixed relation a lever 229, the outer end of which carries a laterally disposed connecting yoke 230 operatively engaged with a sleeve element 231 slidable on the lower end of the actuator rod 227 against tension of an expansion spring 232 coiled about the rod between the sleeve element 231 and a fixed abutment 233 intermediate the ends of the rod, as shown in Fig. 7. Above the abutment 233 another expansion spring 234 is coiled loosely about the rod between the abutment and a washer 235 bearing against the under surface of the base plate of the magazine. From this construction it will be obvious that as the shaft 71 is rotated in a clockwise direction with respect to Figure 1 under the influence of the connecting rod 57, the shaft acting at the plain end of the loom will elevate the sleeve element 231 which acts through the spring 232 and fixed abutment 233 to elevate the actuator rod 227 and shift the shuttle stack carriers 166 and 167 from their position as shown in Figure 7 to a position in which the stack carrier 166 is lowered and the carrier 167 is elevated, this arrangement disposing the blue shuttle holder in position whereby the magazine will dispense a blue shuttle upon actuation of the ejecting slide 174.

As previously explained, the feeler motion of the shifting shuttle box 33 initiates the actuation of the mechanism for shifting the change shuttle box 123 to replacement shuttle receiving position and also for actuating the mechanism for dispensing and transferring shuttles from the magazine, together with the shifting of the shuttle stack holders in the magazine when this is necessary. However, the mechanical actuation of the means for effecting these operations is accomplished through the control unit 52, best shown in Figures 10, 11, 12 and 14. This unit comprises a rectangular casing 236 having an open top and supporting a main driving shaft 237 journaled in bearings 238 suitably mounted in the casing walls. The shaft extends through the rear wall of the casing and has thereon a fixed sprocket 239 over which is trained the chain 53 whereby the driving shaft 237 is continuously rotated by its chain and sprocket connection with the bottom shaft 55 of the loom which in this known type turns once in every two beats. The ratio of sprocket 54 to sprocket 239 is 2 to 1. Fixed to the opposite end portion of the driving shaft 237 is a pinion 240 in constant mesh with a driven gear 241 having an inwardly disposed hub sleeve 242 by which, through the agency of any suitable means, the gear is fixed on a cam shaft 243 disposed parallel with the shaft 237 and vertically aligned therewith beneath the same in appropriately spaced relation; the ratio of gear 241 and 240 being 2 to 1. The cam shaft 243 is journaled at its opposite ends in bearings 244 supported in the side walls of the casing. The constantly driven cam shaft 243 has fixed thereto a cam hub 245 having a riser portion 246 engaging the arcuate lower end of a clutch actuator 247 mounted for vertical reciprocation in guides 248 carried by a supporting bracket 249 extending from the casing wall structure. The clutch actuator 247 straddles the shaft 237 over a sleeve 250 fixed thereon, the actuator being provided with a vertical slot 251 to accommodate the shaft and its sleeve.

The sleeve 250 being fixed to the driving shaft 237 is in effect an integral part of the shaft and extends the entire length between the bearings 238. At an intermediate portion the sleeve is formed with a laterally extending annular shoulder 253 and with a slidable washer 252 arranged in parallel spaced relation to define the limits of longitudinal movement of the hub portion 254 of a movable clutch element 255 that is keyed to the shaft carried sleeve 250 for longitudinal slidable movement thereon between the stop shoulder 253 and slidable washer 252. On its end portion adjacent the actuator 247 the movable clutch element hub 254 is provided with an axially extending circumferential cam riser 256 which, in the rotation of the movable clutch element with the driving shaft, engages a lateral enlargement 257 at the upper end of the clutch actuator 247 when the actuator is in its lowermost position whereby the enlargement will be disposed within the operating plane of the movable clutch element cam riser 256. The engagement of the cam riser 256 with the lateral enlargement of the clutch actuator, as shown in Figure 12, forces the movable clutch element 255 to the left along the sleeve 250 into driving engagement with a driven clutch element 258 that is loosely rotatable on the shaft 237 and which carries a lateral hub 259 having fixed thereon a pinion 260 in constant mesh with a driven ring gear 261 fixed to a driven shaft 262; the gear ratio being 4 to 1.

The driven shaft 262 is journaled at its ends in bearings 263 supported in the casing walls, the shaft being parallel to the main driving shaft 237 and laterally spaced therefrom substantially in a common horizontal plane. Inwardly of the driven ring gear 261 the shaft 262 has fixed thereto a control disc 264 carrying on its inner face a control cam 265 having a peripheral surface of a width substantially three times the peripheral width of the control disc 264 and formed with diametrically opposed arcuate riser portions 266 and 267 separated by reduced arcuate dwell portions 268 and 269 of a lesser radius than the risers.

As shown best in Figure 11, the maximum diameter of the opposed risers 266 and 267 is appreciably less than the diameter of the control disc 264. In the circumferential area between the peripheries of the risers and the periphery of the control disc the disc is provided with diametrically opposed arcuate cut-out recesses 270 through either of which, when properly aligned with the movable clutch element 255, the clutch element is adapted to pass when moved longitudinally on the main drive shaft under the influence of the clutch actuator 247, the movable clutch element being circular. An expansion spring 271 coiled about the sleeve of the main driving shaft 237 in an axial recess of the loose clutch element 258 bears against the slidable clutch element 255 to hold the same out of driving connection when the clutch actuator 247 is elevated to dispose the lateral enlargement 257 out of registry with the cam riser 256 on the slidable clutch element. It should here be noted that under the influence of the clutch actuator, the slidable driving clutch element 255 is moved entirely through the control disc recess 270, as shown in Figure 12, so that under the rotation of the main driving shaft the clutch element engages behind the control disc and serves to maintain the clutch element 255 in driving engagement with the driven clutch element 258. This driving engagement is maintained until during the relative rotation of the clutch element 255 and the control disc 264 one or another of the control disc recesses 270 registers with the clutch element, whereupon, provided the clutch actuator 247 has been elevated through the influence of the cam 246, the spring 271 operates to restore the driving clutch element 255 to its disengaged position, passing the same into the control disc recess wherein the clutch element is free to rotate with the main driving shaft as the motion of the control disc will have been arrested immediately upon disengagement of the clutch.

As shown in Fig. 11, the casing wall at the end opposite that carrying the clutch actuating means is provided with parallel inwardly extending bearing lugs 272 supporting a rocker shaft 273 which parallels the control disc shaft 262 and in a lower horizontal plane, there being a clearance between the periphery of the control disc and the rocker shaft. The shaft 273 provides a pivot fulcrum for the lower end of a rocker yoke having parallel upright arms 274 loosely mounting at their upper ends a transverse pivot pin 275. Intermediate its top and bottom the rocker yoke is provided with an axle member 276 positioned at each end in the arms 274 and mounting a roller 277 in the horizontal plane of the control disc shaft 262. A spring 278, connected between the upper end portion of the rocker yoke and the support 249 for the clutch actuator guide, provides a means normally urging the rocker yoke toward the control disc so that its roller 277 is constantly engaged with the control disc carried cam 265. Obviously, as the control disc 264 is rotated the rocker yoke will be oscillated on its fulcrum 273 to move its upper end in an arc defined by the height of the risers 266 and 267 with respect to the cam portions 268 and 269. The connecting rod 56 is provided at its inner end with an eye pivotally engaging the pin 275 between the upper ends of the yoke arms 274 so that as the rocker is oscillated the connecting rod will transmit the motion to the sleeve shaft 124 for shifting the change box 123 and for operating the replacement shuttle dispensing and transferring means of the magazine in the manner previously described.

The connecting rod 57 which at its outer end has an operating crank connection to the shaft 71 for effecting the shift of the shuttle holder stacks in the magazine, has its inner end provided with a laterally enlarged head 279 pivotally connected with the pin 275 between the upper ends of the rocker yoke arms 274 alongside the end connection of the connecting rod 56. The head 279 of the connecting rod 57, Fig. 14, is provided with an L-shaped slot through which the pivot pin 275 is disposed, one arm of the slot being arranged in the longitudinal axis of the rod while the other arm extends vertically perpendicular thereto, as best shown in Figure 14.

In the normal position of the connecting rod 57 it is so disposed that the pin 275 of the rocker yoke plays in the axial slot portion as the yoke is rocked under the influence of the control disc cam, so that no driving motion is transmitted to the connecting rod. When loom pattern conditions so determine, the head motion controlled lever 65 is actuated to shift the connecting rod 57, through the medium of the rod 58, chain 59 and rod 62, as seen in Figure 2, whereby to dispose the pin 275 of the rocker yoke in the vertical arm of the slot 280, whereupon the oscillation of the rocker yoke under the influence of the control disc carried cam will drive the connecting rod 57 accordingly to rock the shaft 71 and effect a shift of the shuttle holder stacks in the magazine in the manner previously described.

In the normal operation of the loom the control unit 52 is dormant and is not activated until the depletion of an active shuttle initiates its operation through the feeler motion at the shifting shuttle box. The clutch actuating slide member 247 of the control unit normally is retained in elevated position out of actuating engagement with the driving element of the clutch. The means for holding the actuator slide elevated consists of an upstanding latch arm 281 pivotally connected at its lower end to the lateral enlargement 257 of the actuator slide and having its upper end provided with a hook portion 282 in latched engagement over a tongue 283 on the end of a rocking armature 284 pivoted as at 285 intermediate its ends in the supporting bracket structure 286 which mounts the feeler motion controlled solenoid 75, the solenoid plunger having a link connection 287 to the other end of the rocking armature. The latch arm 281 is normally urged clockwise of Figure 11 into latching position by means of a spring 288 connected between a portion of the guide supporting bracket 249 and a lateral extension 289 on the latch arm. The lateral extension 289 is perpendicular to the latch arm and is of a length sufficient to dispose the spring 288 substantially in a vertical plane so that as the spring contracts under its normal tension it not only draws the latch arm into latching engagement but acts vertically on the extension 289 to transmit a vertical downward pull urging the clutch actuated slide into its lower position in operating engagement with the driving clutch element. In addition to the latch, the clutch actuated slide is held in elevated position by the cam 246 whenever it is engaged with the lower end of the slide and it is by means of the cam 246 that the clutch actuating slide is lifted to its elevated position for latching with the rocking armature solenoid. The cam 246 is up when the running shuttle occupies the shifting box 33, and it is down when the shuttles are in the change box 123.

*The operation*

For purposes of description, it will be assumed that the lay has just arrived at center forward position on a beat of filler picked from the change box 123 into the orange shuttle cell 77 of the shifting shuttle box 33. The parts will then be in position as shown in Figures 1, 3, 4, 5, 6, 7, 9, 10, 11 and 14.

If the shuttle arrives in the cell 77 and is not depleted, there will, of course, be no detection and the feeler motion circuit will remain open at the cell. The loom will then operate in the ordinary manner with the shifting box 33 shifting under control of the head motion. In the type of loom herein disclosed, the head motion controlled shifting of the shifting shuttle box is effected during the period of lay travel from bottom center through center forward to top center, the period during which the warps cross. The pick is made during the interval when the lay goes from top center through center rear to bottom center.

As stated, Figure 1 illustrates the position of the parts when the lay has reached center forward following a pick of orange shuttle thread from the top cell of the change box 123, at the opposite end of the loom. If the shuttle arrives in cell 77 in a substantially depleted condition, a portion of the feeler motion circuit will be closed through the depleted shuttle and cell, as well as at the circuit selector 94, as shown in Figure 13. As the lay beats in the filler, and just before it reaches center forward, the lay controlled switch comprising the contacts 72—73 will close, so that the feeler motion circuit is completed through the solenoid 75, which governs the control unit 52.

Prior to the complete closing of the feeler motion circuit, the control unit parts are in a position shown in Figure 11. When the lay arrives at center forward, the circuit is closed and the solenoid 75 is energized to release the latch which holds up the slide 247 and as the lay goes back to center rear, the main control shaft 237 makes one complete revolution. During one complete revolution of shaft 237 the cam shaft 245 makes one-half a turn and the control disc 264 in operation, makes one-quarter turn.

When the lay starts back for the final pick from the detected orange shuttle in cell 77 of the shifting shuttle box, the cam 246 will move away from beneath the bottom of the slide 247, and by the time the pick is ready to be made, the descending movement of the actuator slide 247 will have shifted the movable clutch element 254 into the clutch engaged position as shown in Figure 12, the clutch having passed through one of the arcuate recesses 270 of the control disc 264.

As the control disc 264 begins to turn clockwise with respect to Figure 11, the riser 267 rocks yoke 274 to actuate the connecting rod 56 and rock the sleeve shaft 124. This rocking movement of the shaft is, of course, a relatively sharp and quick actuation as will be evident from the showing of the cam, as indicated in Figure 11, so that at the opposite end of the loom the change box 123 will be elevated to align its bottom cell with the race plate of the lay in position to receive the final pick of the shuttle from cell 77.

The upward movement of the change box 123, through the mechanism of the shuttle box cam faces and the roller 159, as previously described, rocks the shuttle box wall to the position shown in Figure 8, so that the incoming depleted shuttle is received in the bottom cell 140. At the same time, the rocking movement of shaft 124 acts through the arm 225, see Figure 3, to elevate the actuator rod 186, so that it is disposed in the path of forward movement of the guide 118 when it next returns in the movement of the lay.

As the lay goes forward to beat in the filler laid by the last pick from the cell 77 of the shifting shuttle box, the change box guide 118 engages the abutment 224 of the actuator rod 186, as shown in Figure 3, driving the same forwardly and actuating the magazine to deliver an orange replacement shuttle into the dispensed shuttle holders of the magazine. This action occurs just ahead of actuation of the ejecting plunger 176. As the lay reaches center forward, the few degrees additional rotation of the rocker 198, Figures 1 and 6, brings the set screw 200 into engagement with the lever 201 to actuate the shuttle ejecting plunger 176, see Figure 7, to deliver the dispensed shuttle downwardly into the raised upper cell 139 of the change box. Immediately following this operation, the trailing end of the riser 267 of the control disc 264, see Figure 11, arrives at the rocker roller 277, the roller dropping to the dwell 269 and effecting an immediate lowering of the change box to dispose its upper replacement shuttle receiving cell in operating alignment with the race plate of the lay, so that when the lay next goes back the replaced orange shuttle is in position to be picked from the change box into the proper receiving cell of the shifting shuttle box.

As the lay goes back to make the pick from the replaced shuttle in the change box, the control disc 264 will complete another quarter turn to bring one of its apertures 270 into alignment with the movable clutch element, so that under the influence of the spring 271 the clutch element is moved away from the control disc. Immediately upon disengagement of the clutch element 255 and 258, see Figure 10, the motion of the control disc 264 will be arrested and the parts will assume the position shown in Figure 11, it being understood that the cam 246 has engaged beneath the slide 247 to elevate the same into latched position. Thereupon, the loom resumes its normal operation under the control of the pattern mechanism at the head end for effecting the regular shifts of the shifting shuttle box in accordance with the pattern.

The above described rearward movement of the lay will also result in release of the engagement between the driven actuator rod 186 and the guide 118 of the change box, which permits the rod 186 to drop down into its clear position, it being understood that the sleeve shaft 124 will have been reversely rotated to lower the finger 225, so that when next the lay comes forward there will be no actuation of the rod 186, and consequently no operation of the magazine.

In the operation just described, it has been assumed that replacement was made from a magazine shuttle of orange thread. During the operation just described, the connecting rod 57, see Figures 11 and 14, which controls the shift of the shuttle stack holders in the magazine, has been disposed in a position in which the pin 275 of the rocker 274 plays in the axial slot in the head 279 of the rod, so that under the cycle of operation in effecting a replacement of the orange shuttle, the rod 57 is not actuated.

If it should happen that a shuttle of blue thread arrives in the shifting shuttle box in a depleted condition, the detection will occur as previously described and, of course, during the normal pattern controlled mechanism shift of the shifting shuttle box, see Figures 1 and 2, the head motion will have operated to alter the position of the rod 58 and thus will have placed the connecting rod 57 in a position in which the pin 275 of the control unit actuator 274 is disposed in the vertical arm 280 of the slot in the head 279 of the rod 57. Thus, as the actuator 274 is rocked on its pivot under the influence of the cams of the control disc 264, the exact cycle of operation as previously described will be repeated, but in addition connecting rod 57 will also be actuated so that the shaft 71 will be rocked clockwise with respect to Figure 1 to shift the shuttle stack holders in the magazine, in the manner previously described, to deliver a blue shuttle in position to be dispensed from the magazine. With respect to the remainder of the steps occurring in the replacement cycle, the operation is identical with that previously described.

Reference should here be made to the fact, with respect to Figures 7 and 8, that as the change box 123 moves down from its raised position shown in Figure 8 to its lowered position as shown in Figure 7, the roller 159 will engage the cam faces of the pivoted wall of the box to rock the wall on its pivot 158, so that the binder 155 and the flooring ledge 163 of the lower cell of the box rock outwardly to permit the exhausted shuttle to drop down onto the forwardly inclined deflector 141 which immediately delivers the same forwardly into the receptacle 142.

In the above described operation in effecting replacement of an orange thread shuttle, it will be noted, having particular reference to Figure 13, that when the detection is made from the cell 77 the position of the shifting shuttle box is such that the circuit selector arm 94 will be engaged with the lower contact 105 to establish a circuit through the cell 77 as soon as the lay controlled switch 72—73 closes; it being understood that for the purposes of this description the loom is operating only with the two upper cells 76 and 77.

If the blue shuttle cell 76 is the active working cell aligned with the race plate of the lay, upon the occurrence of substantial thread exhaustion of the shuttle in its shifting shuttle box cell 76 the feeler motion circuit will be partially established through the grounded cell, through the selector 94 which, due to the lowered position of the shifting shuttle box places the upper box carried contact 104 in electrical contact with the selector, thence to the fixed contact of the lay controlled switch. As the lay comes up to center forward position the contacts 72, 73, close to complete the feeler motion circuit through the actuating solenoid 75 in the control unit. This immediately sets into operation the mechanism exactly in the manner previously described, except that in this instance the connecting rod 57 is also actuated to rock the shaft 71 and shift the shuttle stack holders of the magazine to the position whereby the blue shuttle holder 166 will be lowered, so that as the shuttle dispensing slide 174 is operated the magazine will dispense a blue thread replacement shuttle into the holder means 175 whence it is transferred to the elevated receiving top cell of the shuttle box 123 as in the case already described in connection with the orange shuttle transfer. The following operations of shifting the shuttle box to transfer the replacement shuttle and expel the spent shuttle are the same as those described in connection with the orange shuttle change.

As previously stated herein, the automatic replacement of exhausted shuttles is effected only in connection with the two upper cells of the shifting shuttle box containing respectively the arbitrarily designated blue and orange shuttles. As will be well understood by those versed in the art, the shifting shuttle box shifts with respect to the lay under the influence of the head motion control in accordance with loom pattern requirements. At the plain end of the loom the change shuttle box 123 is not influenced by the head motion control and does not shift with respect to the lay except only as it is operated from the mechanism of the control unit, which can only be through initiation of the feeler motion at the shifting shuttle box.

In the embodiment illustrated, if shuttle exhaustion occurs when either of the lower cells 78 and 79 of the shifting shuttle box are in pick position, the feeler motion circuit is established through the branch 109 as shown in Figure 13 to the solenoid control 110 which is energized to throw out the loom clutch and stop the loom so that the shuttle can be replaced by a manual operation. It is to be understood that the two lower cells of the shifting shuttle box are utilized only where a wider variety of pattern is desired. Where a two-color pattern or two variety of thread product is being made, it is necessary only to use the upper two cells for making the operation entirely automatic.

A feature of particular importance in the present invention is found in the feeler motion circuit selector 94 best illustrated in Figure 13. This selector in combination with the lay controlled switch insures that there can never be any actuation of the control unit mechanism to bring about the shift of the shuttle box 123 or any automatic shuttle change unless and until the particular exhausted shuttle which initiates the feeler motion is in proper position in the shifting shuttle box with respect to the race plate of the lay in position to be discharged thereacross and with the lay at the center forward position.

This will be illustrated as follows. The shifting shuttle box 33 of course shifts relative to the lay under the influence of the head motion control at various points of the lay position. Based on the illustration of Figure 13, if the orange shuttle is received into the cell 77 in a depleted condition so that it establishes a portion of the feeler motion circuit through the selector 94, at a time when the switch contacts 72, 73, are separated, and immediately following the entry of the shuttle into the cell 77 the shifting shuttle box 33 is shifted under the influence of the head motion so that the box is lowered to align the blue shuttle cell 76 with the race plate of the lay for a blue pick, then immediately upon the downward movement of the shuttle box 33 the box carried contacts 104 and 105 will be shifted accordingly so that the lower contact 105 will be moved out of engagement with the selector 94 and the upper contact 104 will be moved downwardly into engagement therewith. Thus, as the lay returns to center forward position and closes the contacts 72 and 73 there can be no initiation of the feeler motion circuit for the reason that although the circuit is established from the supply source 89 through the control unit solenoid 75 and the contacts 72 and 73, through selector 94 and upper contact 104 and wire 107 to the blue shuttle cell, it will be broken between the cell and ground due to the presence in the cell of a full shuttle which prevents completion of the circuit. There can thus be no actuation of the control unit. The exhausted orange shuttle remains in its box cell 77 throughout the period of picks for the blue shuttle in cell 76, until in the subsequent operation of the loom the pattern requires a change back to orange picks. Thereupon the shifting shuttle box is elevated to align the orange shuttle cell 77 with the race plate of the lay. Upon the lifting movement of the shuttle box the upper contact 104 carried by the box is separated from the circuit selector 94, and the bottom contact 105 which connects with the orange shuttle cell 77 is brought into contact therewith so that when next the lay returns to center forward position to close the contacts 72 and 73 there will be a complete closure of the feeler motion circuit to energize the control unit solenoid 75 and set into operation the various mechanisms previously detailed for accomplishing a replacement of the exhausted shuttle with a shuttle of the same thread variety.

The known standard type of non-automatic loom, as modified by the present invention to convert the same into an automatic shuttle changing loom, has a four cell shifting shuttle box movable on the lay in accordance with pattern under the head motion control, and at the opposite end of the lay a single cell non-shifting shuttle box that does not move with respect to the lay. The present invention contemplates no change in the loom structure other than the substitution of the herein disclosed novel type of shuttle box 123 for the conventional single cell box together with the arrangement of the feeler motion on the shifting shuttle box and the installation of the control unit and the actuator mechanism driven thereby. All of this material is capable of being readily installed on the standard types of non-automatic looms so that, when operating with only two cells of the shifting shuttle box, the operation of the loom is made entirely automatic, the cost of conversion being very greatly under the cost of purchasing an automatic shuttle changing loom. By means of this invention mill operators are enabled to readily convert the present idle non-automatic looms into automatic shuttle changing looms so that the mills may operate successfully in competition with mills employing extremely cheap labor for the supervision of non-automatic looms.

I claim:

1. In a multi-shuttle shuttle changing loom operating with a shuttle box shifting to render any one of a plurality of weaving shuttles active, a normally stationary lever to be moved to effect shuttle change, a regularly rotating shaft, a driving clutch element slidable axially on the shaft and rotatable therewith, a driven clutch element freely rotatable and axially immovable on the shaft, resilient means normally holding said clutch elements disengaged, a member operable to move the driving clutch element into engagement with the driven clutch element to cause rotation thereof, a releasable latch normally holding said member inoperative, means effective on exhaustion of the active shuttle to release said latch, and means operable by rotation of said driven clutch element to move said shuttle change effecting lever.

2. In a multi-shuttle shuttle changing loom operating with a shuttle box shifting to render any one of a plurality of weaving shuttles active, a normally stationary lever to be moved to effect shuttle change, a regularly rotating shaft, a driving clutch element rotatable with said shaft and slidable axially thereon, a driven clutch element freely rotatable on said shaft and restrained thereon against axial movement, resilient means normally separating the clutch elements, a member operable to cause engagement of the clutch elements to rotate said driven clutch element with the shaft, a releasable latch normally holding said member inoperative, means effective on exhaustion of the active shuttle to release said latch, means operable by rotation of the driven clutch element to move said shuttle change effecting lever, and means operable by rotation of said shaft to restore said clutch operating member to latched inoperative position.

3. In a multi-shuttle shuttle changing loom operating with a shuttle box shifting to render any one of a plurality of weaving shuttles active, a normally stationary lever to be moved to effect shuttle change, a regularly rotating shaft, a driving clutch element movable axially on said shaft and rotatable therewith, a driven clutch element freely rotatable and axially immovable on said shaft, spring means normally separating the clutch elements, a clutch actuator movable in a fixed path relative to said shaft, cooperative cam surfaces on said actuator and driving clutch element whereby to shift said driving clutch element axially on the shaft into engagement with the driven clutch element on movement of said actuator, spring means urging said actuator to such movement, a releasable latch normally holding the actuator inoperative, means effective on exhaustion of the active shuttle to release said latch, means operable by rotation of said driven clutch element to move said shuttle change effecting lever, and means operable from said rotating shaft to restore said clutch actuator to inoperative latched position after release of said latch.

4. In a multi-shuttle shuttle changing loom operating with a shuttle box shifting to render any one of a plurality of weaving shuttles active, a normally stationary lever to be moved to effect shuttle change, a regularly rotating shaft, a driving clutch element movable axially on said shaft and rotatable therewith, a driven clutch element freely rotatable and axially immovable on the shaft at one side of the driving element, spring means between said elements and normally separating them, a clutch actuator movable in a fixed path transversely of the shaft at the other side of the driving clutch element, said driving clutch element and the actuator having cooperating cam means whereby to shift said driving clutch member axially on the shaft to engage and rotate the driven clutch member upon movement of said actuator, means biasing the actuator to such movement, a releasable latch normally holding the actuator against movement, means effective on exhaustion of the active shuttle to release said latch, means operable by rotation of the driven clutch element to move said shuttle change effecting lever, and a cam regularly movable into engagement with said actuator for periodic restoration thereof to latched position.

5. In a multi-shuttle shuttle changing loom operating with a shuttle box shifting to render any one of a plurality of shuttles active, a normally stationary lever to be moved to effect shuttle change, a regularly rotating shaft, a driving clutch element movable axially thereon and rotatable therewith, a driven clutch element freely rotatable and axially immovable on said shaft, expansion spring means between and normally separating the clutch elements, clutch actuator means operative on exhaustion of the active shuttle to bring said clutch elements together against the tension of said spring means for initial rotation of the driven clutch element, a rotatable cam contacting said shuttle change effecting lever to move same during rotation of the cam, gearing operatively connecting said driven clutch member and cam for rotating the latter when the driven clutch member is rotated, and a control member movable with said cam and into engagement against said driving clutch element to hold it engaged with the driven clutch element independently of the clutch actuator during a predetermined cycle of loom operation.

6. In a multi-shuttle shuttle changing loom operating with a shuttle box shifting to render any one of a plurality of shuttles active, a normally stationary lever to be moved to effect shuttle change, a regularly rotating shaft, a driving clutch element movable axially thereon and rotatable therewith, an annular peripheral flange on said clutch element, a driven clutch element freely rotatable and axially immovable on the shaft, an expansion spring surrounding said shaft between and normally separating said clutch elements, a clutch actuator operative on exhaustion of the active shuttle to bring said clutch elements together against tension of the spring to rotate the driven clutch element with the shaft, a member moved regularly by rotation of the shaft to restore said actuator to inoperative position whereby to permit said spring to separate said clutch elements and stop rotation of the driven clutch element, a rotatable control disc having an arcuate peripheral recess receiving the annular peripheral flange of the driving clutch element, gearing operatively connecting said driven clutch element and the control disc for rotating the latter at a slower rate than that of the driven clutch element when rotating, the peripheral portion of said control disc passing behind the flange of the driving clutch element when the latter is moved clear of said arcuate recess by operation of said clutch actuator whereby to hold said clutch elements together after the actuator is restored to inoperative position, and a cam on said control disc contacting said lever to move same during rotation of the disc.

7. In a multi-shuttle shuttle changing loom operating with a shuttle box shifting under a head motion control to render any one of a plurality of weaving shuttles active, a magazine of replacement shuttles corresponding to the weaving shuttles, a normally stationary lever to be moved to effect shuttle change, normally inactive mechanism operable to deliver a shuttle from the magazine to active position, an actuator positively connecting said mechanism and lever for operating said mechanism by movement of the lever, shuttle selecting means in the magazine operable to present a selected shuttle for delivery, a second actuator in positive connection with said selecting means and shiftably connected to said lever for movement thereon to either of two positions in one of which the actuator is caused to move with the lever to operate said shuttle selecting means and in the other of which it is not, a connection between said second actuator and a movable part of the head motion control whereby said second actuator shifts in accordance with movement of said movable part, and means effective upon exhaustion of the active weaving shuttle to move said lever.

8. In a multi-shuttle shuttle changing loom operating with a shuttle box shifting under a head motion control to render any one of a plurality of weaving shuttles active, a magazine of replacement shuttles corresponding to the weaving shuttles, a normally stationary lever to be moved to effect shuttle change, normally inactive mechanism operable to deliver a shuttle from the magazine to active position, an actuator positively connecting said mechanism and lever to operate said mechanism by movement of the lever, shuttle selecting means in the magazine operable to present a selected shuttle for delivery, a second actuator in positive connection with said selecting means and under the joint influence of said head motion control and lever whereby position of the head motion control determines whether or not said second actuator shall be driven by movement of said lever to operate the shuttle selecting means, and means effective on exhaustion of the active weaving shuttle to move said lever.

9. In a multi-shuttle shuttle changing loom operating with a shuttle box shifting under a head motion control to render any one of a plurality of weaving shuttles active, a magazine of replacement shuttles corresponding to the weaving shuttles, a normally stationary lever to be moved to effect shuttle change, normally inactive mechanism operable to deliver a shuttle from the magazine to active position, an actuator positively connecting said mechanism and lever to operate said mechanism by movement of the lever, shuttle selecting means in the magazine operable to present a selected shuttle for delivery, a second actuator connecting said selecting means and lever to operate said selecting means by movement of the lever, a connection between the head motion control and the second actuator whereby to render said second actuator active or inactive depending on position of the control, and means effective on exhaustion of the active weaving shuttle to move said lever.

10. In a multi-shuttle shuttle changing loom having a lay operating with a shuttle box shifting to render any one of a plurality of weaving shuttles active, a magazine of replacement shuttles corresponding to the weaving shuttles, a normally non-shifting shuttle change box moving regularly with the lay and shiftable thereon for a shuttle change, normally inactive mechanism operable to deliver a shuttle from the magazine to said change box when it is shifted, a normally stationary member to be moved to effect shuttle change, a normally inactive actuator adjacent said change box and normally clear of its path of regular movement with the lay and in operating connection with said replacement shuttle delivering mechanism, means on said normally stationary change effecting member and engageable with said actuator to move same into the path of regular movement of said change box as the member is moved, whereby to cause said change box to abut against and drive the actuator to operate the replacement shuttle delivering mechanism, and means effective on exhaustion of the active weaving shuttle to move said change effecting member.

11. In a multi-shuttle shuttle changing loom having a lay operating with a shuttle box shifting to render any one of a plurality of weaving shuttles active, a magazine of replacement shuttles corresponding to the weaving shuttles, a normally non-shifting shuttle change box moving regularly with the lay and shiftable thereon for a shuttle change, normally inactive mechanism operable to deliver a shuttle from the magazine to said change box when it is shifted, a normally stationary shaft adapted to be rocked to effect shuttle change, a rod loosely slidable in the loom adjacent said change box and disposed normally clear of its path of regular movement with the lay, one end of said rod being in operating connection with said replacement shuttle delivering mechanism, an arm fixed to said shaft and projecting therefrom for engagement with said rod to move the rod into the path of regular movement of said change box when the shaft is rocked, whereby to cause said change box to abut against and drive the rod in a direction to operate the replacement shuttle delivering mechanism, and means effective on exhaustion of the active weaving shuttle to rock said shaft.

12. In a multi-shuttle shuttle changing loom having a lay operating with a shuttle box shifting to render any one of a plurality of weaving shuttles active, a magazine of replacement shuttles corresponding to the weaving shuttles, a normally non-shifting shuttle change box moving regularly with the lay and shiftable thereon for a shuttle change, normally inactive mechanism operable to deliver a shuttle from the magazine to said change box when the box is shifted, a normally stationary shaft having a bearing in the loom frame and adapted to be rocked to effect shuttle change, a rod loosely slidable in the loom frame adjacent said change box and in operating connection at one end with said replacement shuttle delivering mechanism, an abutment extending laterally from said rod normally clear of the path of travel of said change box during its regular movement with the lay, an arm fixed to said rockable shaft and extending therefrom into engagement with said rod for moving the same to dispose its abutment in the path of regular lay movement of said change shuttle box when such shaft is rocked, whereby to cause said change box to contact said abutment and drive the rod to operate said replacement shuttle delivering mechanism, and means effective on exhaustion of the active weaving shuttle to rock said shaft.

PHILIP F. TIRRELL.